(12) United States Patent
Ng et al.

(10) Patent No.: US 11,535,007 B2
(45) Date of Patent: Dec. 27, 2022

(54) BENDABLE RESIN HAVING PATTERNED ELEMENTS FOR IMPROVING PENETRATION OF WIRELESS COMMUNICATION SIGNALS

(71) Applicant: ANTwave Intellectual Property Limited, Hong Kong (CN)

(72) Inventors: Kung Bo Ng, Hong Kong (CN); Wai Keung Lo, Hong Kong (CN); Chun Kit Wong, Hong Kong (CN); Chun Hung Lam, Hong Kong (CN); Siu Yee Mok, Hong Kong (CN); Hang Wong, Hong Kong (CN)

(73) Assignee: ANTwave Intellectual Property Limited, Hong Kong (CN)

( * ) Notice: Subject to any disclaimer, the term of this patent is extended or adjusted under 35 U.S.C. 154(b) by 51 days.

(21) Appl. No.: 17/301,768

(22) Filed: Apr. 14, 2021

(65) Prior Publication Data

US 2021/0367347 A1 Nov. 25, 2021

Related U.S. Application Data

(60) Provisional application No. 62/704,630, filed on May 19, 2020.

(51) Int. Cl.
*B32B 17/06* (2006.01)
*B32B 7/025* (2019.01)
(Continued)

(52) U.S. Cl.
CPC ............ *B32B 17/061* (2013.01); *B32B 7/025* (2019.01); *B32B 17/10* (2013.01); *B32B 27/08* (2013.01);
(Continued)

(58) Field of Classification Search
CPC ..... B32B 17/061; B32B 17/025; B32B 17/10; B32B 27/08; B32B 27/365; B32B 27/204; B32B 27/412
(Continued)

(56) References Cited

U.S. PATENT DOCUMENTS

2018/0316365 A1* 11/2018 Völkel ................. H01Q 1/1271
2020/0048958 A1 2/2020 Kum et al.
(Continued)

OTHER PUBLICATIONS

International Search Report and Written Opinion of PCT application No. PCT/CN2021/087212 issued from the International Search Authority dated Jul. 19, 2021.

*Primary Examiner* — Betelhem Shewareged
(74) *Attorney, Agent, or Firm* — S&F/WEHRW

(57) ABSTRACT

A device attachable to a substrate for improving penetration of wireless communication signals is provided. The device is a bendable resin configured to enhance penetration of an incidental radio wave from a first region through the substrate to a second region by forming one or more communication signal beams in the second region. The bendable resin includes a base layer of a first material, and one or more patterned elements each formed by providing a metapattern of a second material on the base layer. The first and second materials are different and selected from the group consisting of a dielectric material and a metallic material. Each individual patterned element is configured to tilt the incidental radio wave to form the one or more communication signal beams, wherein each individual communication signal beam is beam-focused at a predetermined focal point or a predetermined focal area in the second region.

20 Claims, 25 Drawing Sheets

(51) Int. Cl.
    *B32B 27/08*         (2006.01)
    *B32B 17/10*         (2006.01)
    *B32B 27/36*         (2006.01)
    *H01Q 15/00*        (2006.01)

(52) U.S. Cl.
    CPC ....... *B32B 27/365* (2013.01); *H01Q 15/0086* (2013.01); *B32B 2255/10* (2013.01); *B32B 2255/205* (2013.01); *B32B 2307/204* (2013.01); *B32B 2307/412* (2013.01)

(58) Field of Classification Search
    USPC ......................................................... 428/209
    See application file for complete search history.

(56) References Cited

U.S. PATENT DOCUMENTS

2021/0050881 A1    2/2021   Ng et al.
2021/0367347 A1*  11/2021  Ng ..................... H01Q 15/0086

* cited by examiner

17x17 elements  
104

Single focal
point design

17x17 elements  
104

Dual focal
point design

BENDABLE RESIN HAVING PATTERNED ELEMENTS FOR IMPROVING PENETRATION OF WIRELESS COMMUNICATION SIGNALS

CROSS-REFERENCE TO RELATED APPLICATIONS

This application claims the benefit of U.S. Provisional Patent Application No. 62/704,630, filed on May 19, 2020, which is incorporated by reference herein in its entirety.

FIELD OF THE INVENTION

The present disclosure generally relates to a bendable resin having patterned elements for improving penetration of wireless communication signals, and particularly relates to a transparent or a semi-transparent electrically conductive structure attachable to a substrate for transmitting the wireless communication signals, such as the 4G and the 5G signals and future communication technologies, from outdoor to indoor by wave impedance matching.

BACKGROUND OF THE INVENTION

The fifth-generation (5G) wireless communication system adopts the millimeter wave (mmWave) band to achieve higher network speeds and lower latency than the fourth-generation (4G) wireless communication system or other earlier technologies. The operating frequency of 5G is generally in the range of 24 GHz to 60 GHz or more. The frequency will be increased further in the later 6G or other more advanced technologies. Such advanced wireless technologies can bring a significant improvement on the wireless data communication with real-time, high-throughput, and low-latency network access, which particularly enables technologies for Internet of Things (IoT) and various unmanned applications, such as autonomous vehicles, control systems for smart cities, high-quality live broadcasting, and remote healthcare.

With the mmWave band, the 5G system is expected to provide a very large bandwidth to support applications with extremely high data rates, which may deliver data with speed up to 1 Gbps. However, as the operating frequencies heighten, the 5G signals may suffer serious outdoor to indoor penetration loss. The short wavelengths at those high frequencies mean that mmWave is very susceptible to be blocked or reflected by building walls or even windows. The same problem also appears in other wireless systems such as radar at 60 GHz, 70 GHz, and so on. This may not be an issue in 4G or earlier generations. The operating frequency for 4G is generally between 700 MHz and 5.8 GHz, and signals with lower frequencies can pass through a transparent substrate, such as a glass window, of a building.

As an example, FIG. 1 demonstrates the problem of wireless communication, particularly for 5G networks, when delivering data from outdoor to indoor, according to one embodiment known in the art. In the urban area, the outdoor base station system typically has antennas 10 either in the form of towers or placed on building rooftops. Some statistic shows that more than 80% of all mobile data traffic is consumed indoors. Therefore, the outdoor to indoor penetration performance is crucial to the signal coverage of the wireless communication system. When an incidental radio wave 31 is transmitted from the antenna 10 towards a building, some radio waves are reflected by the exterior walls 22 or windows 20, or are lost when penetrating through the windows. In particular, the ordinary glass windows may introduce a smaller penetration loss, but multi-layer glass windows, building windows (such as tinted glass), and partition walls may significantly increase the penetration loss. The problem is the result of the signal impedance mismatch between the air and the glass. Therefore, a reflected radio wave 33 is expected to propagate away from the building. With a wireless communication signal having a high frequency band (e.g.: above 24 GHz), there is a merit in transfer rate but the reflection loss and the penetration loss would seriously affect the power of the penetrated radio wave 32, which may not be as strong as the incidental radio wave 31 after propagation through the walls 22 or windows 20. Therefore, the indoor coverage using the mmWave band is not sufficient for meeting an acceptable data communication performance. In some cases, the user may only be able to use 4G or a network of earlier generations after entering into a building.

In order to provide better indoor coverage, a distributed antenna system (DAS) may be deployed in the indoor area and building premises for providing internet connectivity. DAS can be driven using a direct connection to the base station or via repeaters. However, DAS may require complex connections between multiple antenna elements and a central hub using fiber optics, which is very expensive and time-consuming to install and upgrade. The infrastructure management and internet service providers may need to make a significant investment for upgrading the equipment and software in order to receive the 5G networks and transmit the received signal to the indoor area.

To solve this problem, a slotted electrically conductive structure is disclosed by the Applicant in a pending U.S. patent application Ser. No. 16/748,835. The structure is attachable to a window for enhancing the penetration of the incidental radio wave through the window. The slotted electrically conductive structure includes a metallic base layer of transparent metal or metal oxide and one or more patterned slots provided on the metallic base layer. Each of the patterned slots comprises a plurality of feature elements covering an entire area of the patterned slot. The slotted electrically conductive structure reduces thermal energy loss through the substrate and the plurality of feature elements is configured to allow the incidental radio wave to pass through the slotted electrically conductive structure.

The present disclosure is a continuous development in this regard by providing an alternative structure with patterned elements, that seeks to improve the penetration of the wireless communication signals. Furthermore, other desirable features and characteristics will become apparent from the subsequent detailed description and the appended claims, taken in conjunction with the accompanying drawings and this background of the disclosure.

SUMMARY OF THE INVENTION

Provided herein is a bendable resin having patterned elements for improving penetration of wireless communication signals.

According to certain aspects, a bendable resin attachable to a substrate is provided. The bendable resin is configured to enhance penetration of an incidental radio wave from a first region through the substrate to a second region by forming one or more communication signal beams in the second region. The bendable resin comprises a base layer of a first material, and one or more patterned elements each formed by providing a meta-pattern of a second material on the base layer. The first and second materials are different and selected from the group consisting of a dielectric material and a metallic material. Each individual patterned element is configured to tilt the incidental radio wave to form the one or more communication signal beams, wherein each individual communication signal beam is beam-focused at a predetermined focal point or a predetermined focal area in the second region.

In another embodiment of the present disclosure, the meta-pattern is configured to adjust an amplitude and a phase of the incidental radio wave when the incidental radio wave is transmitting through the substrate to the second region.

In another embodiment of the present disclosure, the bendable resin has a thickness of $1/10$ $\lambda$ to $1/4$ $\lambda$.

In another embodiment of the present disclosure, the metallic material comprises a metallic grid having plural metallic lines, wherein each of the plural metallic lines is separated from an adjacent metallic line by a length less than or equal to $1/10$ $\lambda$.

In another embodiment of the present disclosure, the metallic material is a metal or a metal oxide.

In another embodiment of the present disclosure, the dielectric material is polycarbonate, Polyethylene Terephthalate (PET), Polyvinyl chloride (PVC), Acrylonitrile butadiene styrene (ABS), or Poly(methyl methacrylate) (PMMA).

In another embodiment of the present disclosure, the one or more patterned elements are arranged in rows and columns repeatedly across the base layer, and the meta-pattern of each of the one or more patterned elements are formed by combining plural feature patterns.

In yet another embodiment of the present disclosure, the bendable resin comprises a transparent film attached to the base layer for lowering dielectric constant of the substrate. Preferably, the transparent film is polycarbonate with dielectric constant of 3 to 3.9.

Preferably, the incidental radio wave is a wireless radio wave operating with 5G technologies.

According to certain aspects, a multilayer structure attachable to a substrate is provided. The multilayer structure is configured to enhance penetration of an incidental radio wave from a first region through the substrate to a second region by forming one or more communication signal beams in the second region. The multilayer structure comprises a base layer of a first material, a transparent film attached to the base layer for interfacing the substrate and lowering dielectric constant of the substrate, and one or more patterned elements each formed by providing a meta-pattern of a second material on the base layer or the transparent film. The first and second materials are different and selected from the group consisting of a dielectric material and a metallic material. Each individual patterned element is configured to tilt the incidental radio wave to form the one or more communication signal beams, wherein each individual communication signal beam is beam-focused at a predetermined focal point or a predetermined focal area in the second region.

According to certain aspects, a method for generating a meta-pattern for forming a patterned element on a bendable resin is provided. The bendable resin attachable to a substrate and configured to enhance penetration of an incidental radio wave from a first region through the substrate to a second region by forming one or more communication signal beams in the second region. The method comprises the steps of obtaining a set of specifications associated with a predetermined focal point or a predetermined focal area in the second region; determining a real image based on actual data or transmission results; randomly setting input parameters and generating, by a pattern generator, a plurality of feature patterns arranged in rows and columns repeatedly to form an emulation image; determining, by a discriminator, a discriminator loss and a generator loss based on a discrimination in a signal strength between the real image and the emulation image; iterating the input parameters to generate other novel emulation images for determining the discrimination in the signal strength; and determining the meta-pattern for the set of specifications with smallest values in the discriminator loss and the generator loss.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which.

DETAILED DESCRIPTION OF THE INVENTION

Figure 1:
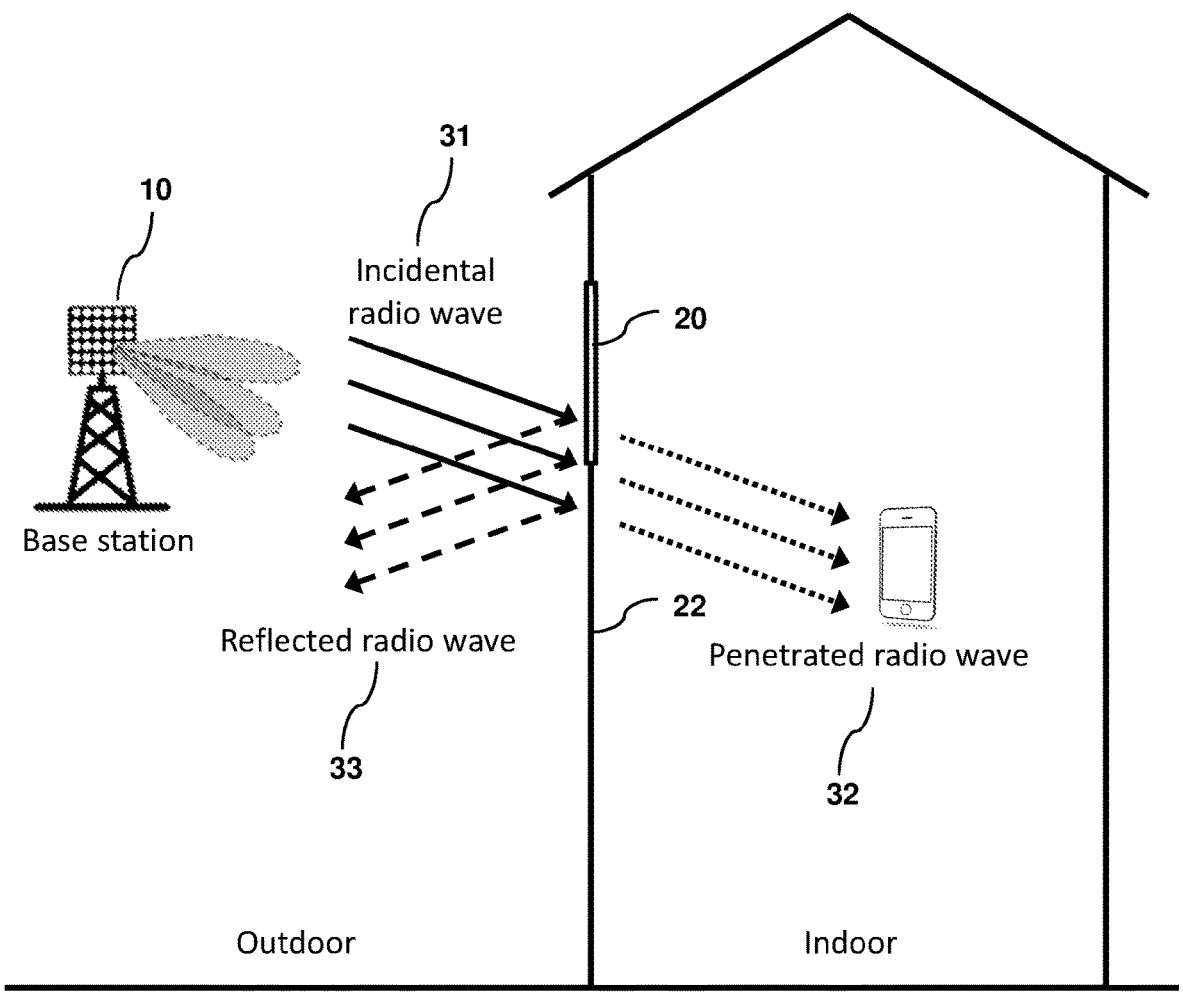
FIG. 1 is a conceptual diagram depicting the propagation of the wireless communication signal from outdoor to indoor, particularly for 5G signal.

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and structure described in the exemplary embodiment without departing from the scope of the present disclosure as set forth in the appended claims.

The present disclosure generally relates to a bendable resin having patterned elements for improving penetration of wireless communication signals. More specifically, but without limitation, the present disclosure relates to a transparent or semi-transparent electrically conductive structure attachable to a substrate for transmitting the wireless communication signals, such as the 4G and the 5G signals, from outdoor to indoor by wave impedance matching.

As used herein, the term "dielectric constant ($\varepsilon_r$)" is used to refer to the ratio of the permittivity of a substance to the permittivity of free space. It is an expression of the extent to which a material concentrates electric flux and is the electrical equivalent of relative magnetic permeability. When the dielectric constant increases while all other factors remain constant, the electric flux density increases. This enables objects of a given size, such as sets of metal plates, to hold their electric charge for long periods of time, and/or to hold large quantities of charge.

The term "region" is used to denote an area or a space distinguishable from other regions, which may be separated from another region by boundaries, layers of material or a substrate.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to illuminate the invention better and does not pose a limitation on the scope of the invention unless the claims expressly state otherwise. Recitation of ranges of values herein are merely intended to serve as a shorthand method of referring individually to each separate value falling within the range, unless otherwise indicated herein, and each separate value is incorporated into the specification as if it were individually recited herein. No language in the specification should be construed as indicating any non-claimed element as essential to the practice of the invention.

Film Structure for Enhancing Substrate Penetration

Figure 2A:
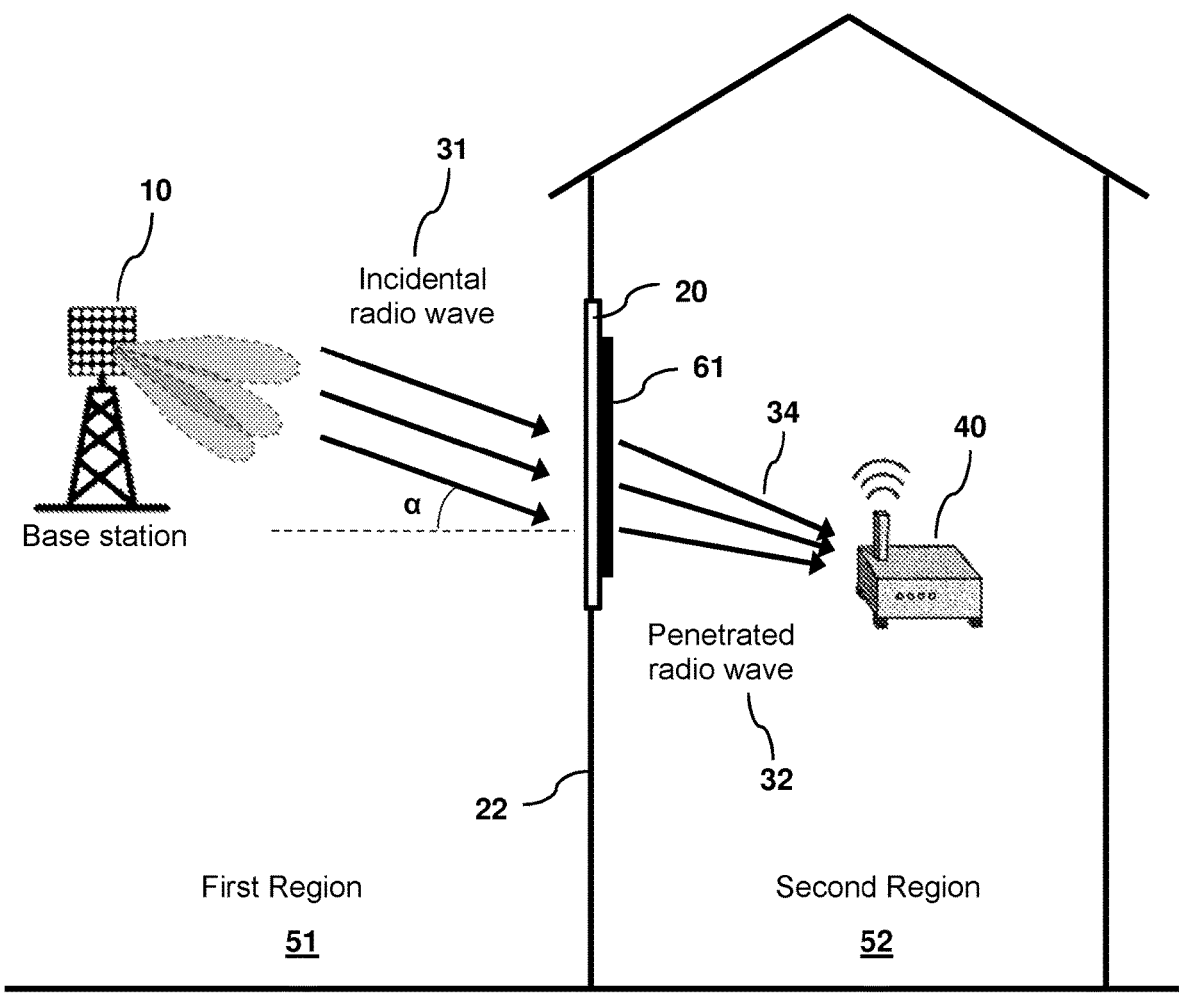
FIG. 2A is a conceptual diagram depicting the propagation of the wireless communication signal through a substrate with a transparent film attached from inside.
Figure 2B:
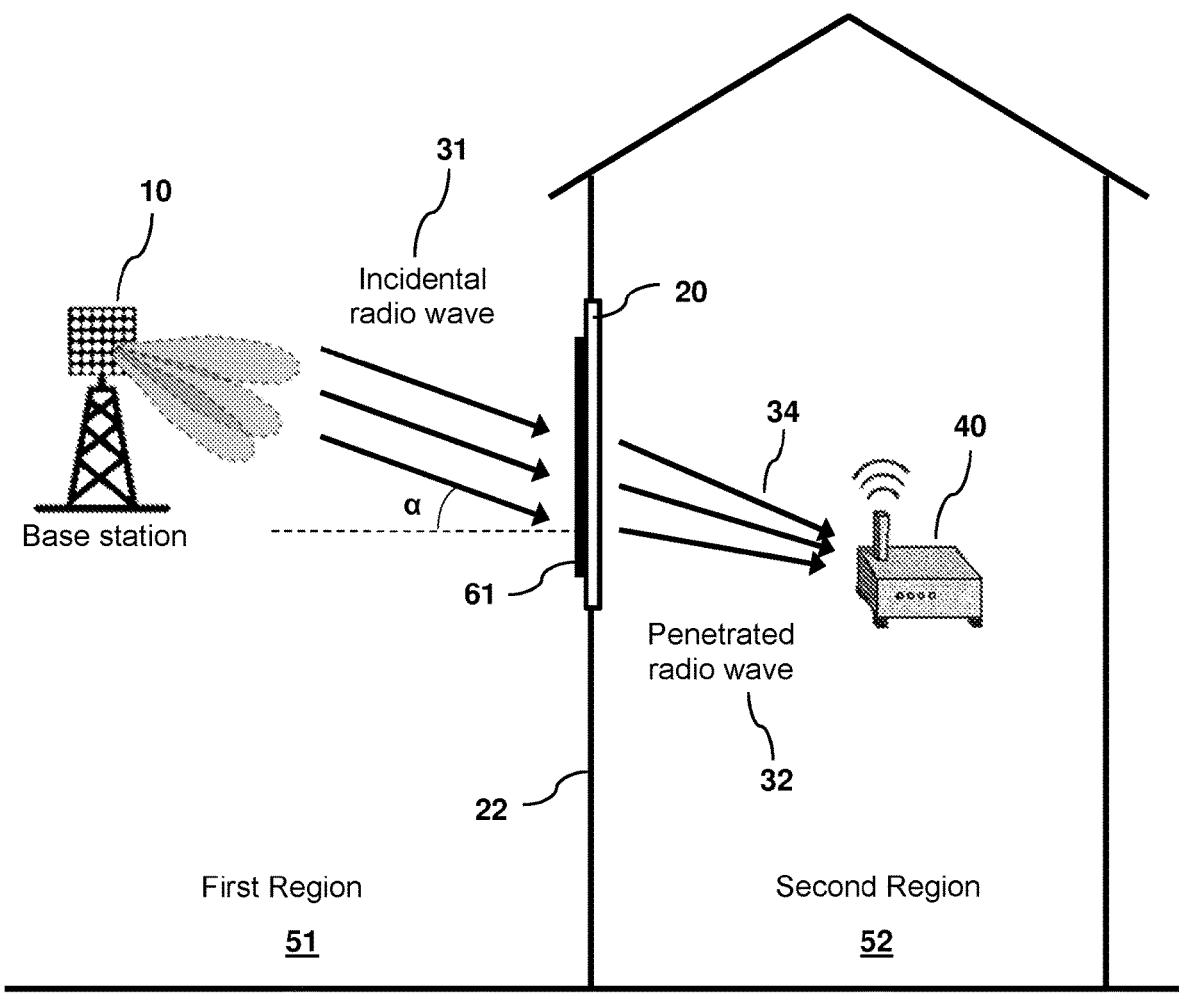
FIG. 2B is a conceptual diagram depicting the propagation of the wireless communication signal through a substrate with a transparent film attached from outside.
Figure 2C:
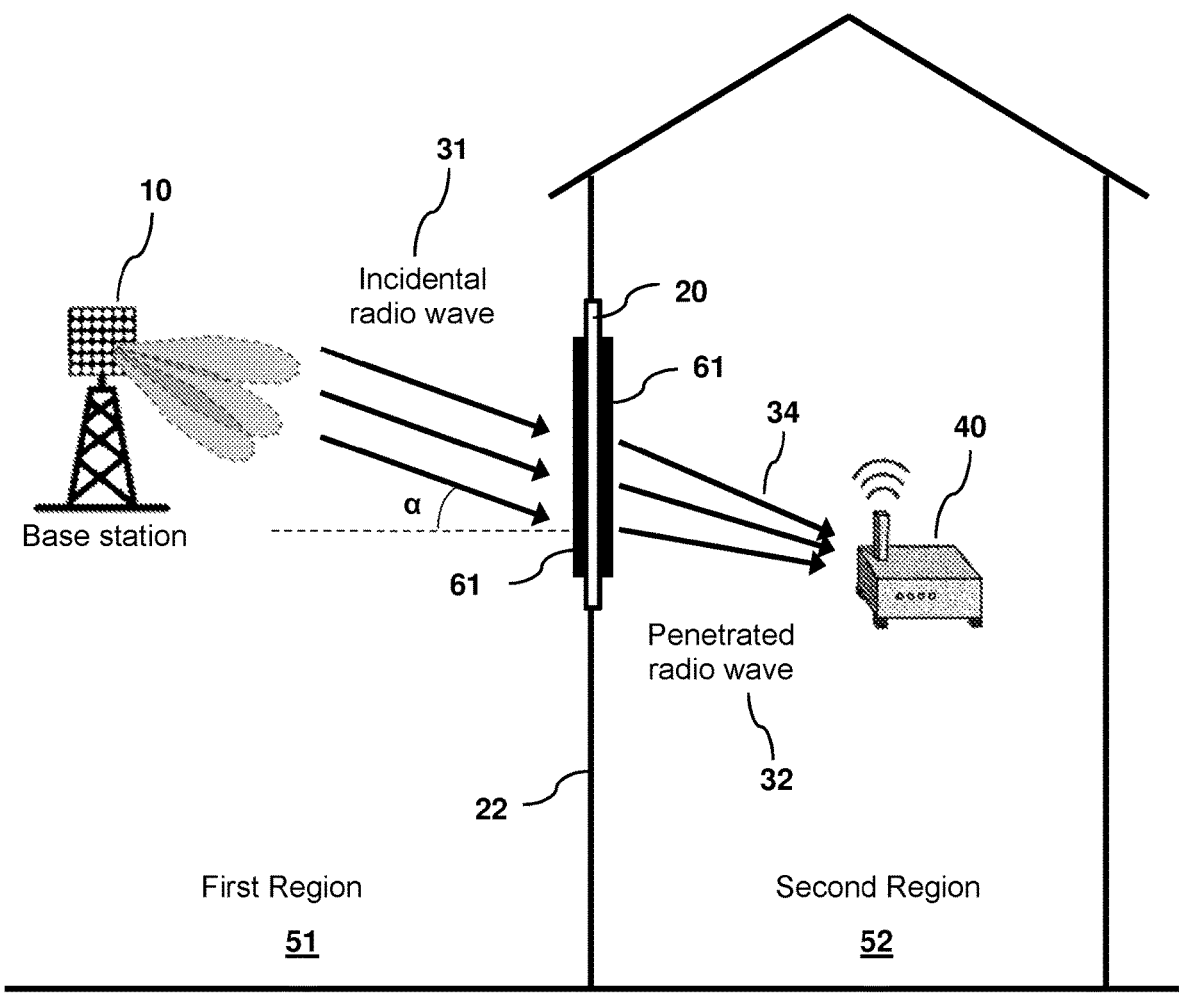
FIG. 2C is a conceptual diagram depicting the propagation of the wireless communication signal through a substrate with a transparent film attached on both sides.

FIGS. 2A-2C illustrate the propagation of a wireless communication signal from an outdoor base station (BS) 10 to a customer premises equipment (CPE) 40 at an indoor position through a substrate 20 having one or more transparent films 61 attached. The BS 10 comprises antenna equipment that can be configured to transmit or receive signals for multiple users. The signal can be a wireless radio wave operating with 5G, 4G, 3G, or other technologies in succession of the 5G technology (such as 6G) using higher frequencies than 5G. The spirit of the present disclosure may also be utilized in other wireless communication systems, which includes but be not limited to Bluetooth, Wi-Fi communications, near field communication (NFC), radio-frequency identification (RFID), satellite communications, etc. The CPE 40 is a terminal device connectable to the network, which may be a modem, a set-top box, or a terminal. The CPE 40 is preferably provided inside a building and in the vicinity of the substrate 20. The substrate 20 may be a transparent glass or window installed on the wall 22 of a building.

The BS 10 is generally in the form of a tower or placed on a building rooftop in a first region 51. The first region 51 may be an outdoor environment. The CPE 40, positioned in a second region 52, attempts to communicate with the BS 10. The second region 52 may be an indoor environment, a car interior, or an area physically separated from the first region 51 by a boundary, a structure, or a wall. Wireless communication signals using lower frequencies, such as 3G and 4G technologies, can generally pass through the substrate 20 of a building and reach the second region 52 with negligible loss in signal strength. Therefore, a user can still effectively perform data and voice communication using the 3G and 4G technologies in an indoor environment.

However, when the operating frequencies heighten to 24 GHz to 60 GHz in the 5G technology, severe reflection loss and penetration loss are inevitable. The ability in penetrating material decreases and the signals may suffer serious outdoor to indoor penetration loss. As previously shown in FIG. 1, the incidental radio wave 31 may partially be reflected by the exterior wall 22 and partially be lost when penetrating through the wall 22 or the substrate 20. The penetrated radio wave 32 received or transmitted by the CPE 40 in an indoor environment is expected to be a weaker signal, which may result in missing the expected performance in speed and latency of the 5G signals.

The one or more transparent films 61 can be attached directly on the inner surface of the substrate 20 (FIG. 2A), the outer surface of the substrate 20 (FIG. 2B), or both sides of the substrate 20 (FIG. 2C). The substrate 20, after attaching the one or more transparent films 61 thereon, is configured to converge the incidental radio wave 31 to a focal point or a focal area 34 in the second region 52. The penetrated radio wave 32 can be picked up by the CPE 40 in the second region 52.

Figure 2D:
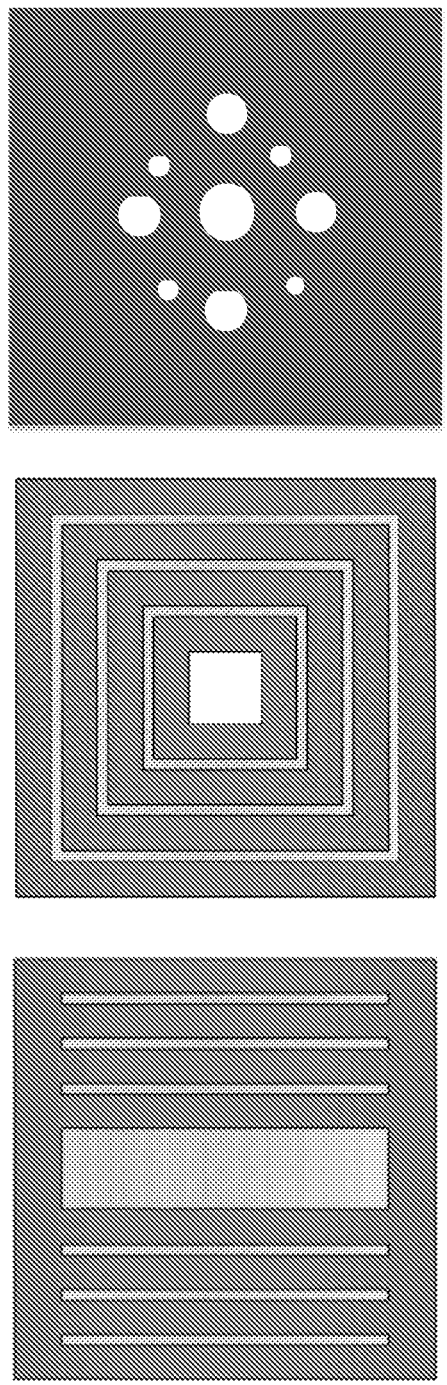
FIG. 2D shows examples of patterns of through-hole on a transparent film.

As it is known that the wave impedance is given by the ratio of the electric field to the magnetic field (E/H). This reflection of the wave depends on the impedance mismatch of the radio wave traveling in the air relative to the substrate 20. The method is demonstrated in FIGS. 2A-2C is to allow the wireless communication signal to pass through the substrate 20 by reducing the reflected signal from the substrate 20, by adhesively attaching a uniquely designed transparent films 61 thereon. FIG. 2D provides three examples of patterns of through-hole on a transparent film 61, which generally symmetrically arranged in vertical, horizontal, or both directions. As a result, the reflected radio wave 33 signal strength can be minimized to at least 10% of the signal strength of the incidental radio wave 31. Therefore, the substrate 20 has a first dielectric constant, which is significantly larger than the second dielectric constant of the air in the first region 51. By adhesively attaching the transparent films 61 to the substrate 20, the film together with the substrate 20 has a third dielectric constant, which has a value closer to the second dielectric constant from radio wave point of view. An example of the material of the transparent film 61 is polycarbonate with dielectric constant of 3 to 3.9. The wave impedance of the air and the substrate 20 can approximately be matched to minimize the wave reflection at the boundary between the air and the substrate 20. The CPE 40 in the second region 52 can effectively communicate with the BS 10 as the penetrated radio wave 32 is a stronger signal. In certain embodiments, each of the transparent films 61 may include a plurality of layers of films with different dielectric constants, thereby the plurality of layers of films are arranged with a gradual change in impedance. This is called wave impedance transformation of medium.

Bendable Resin Structure for Enhancing Substrate Penetration

Figure 3:
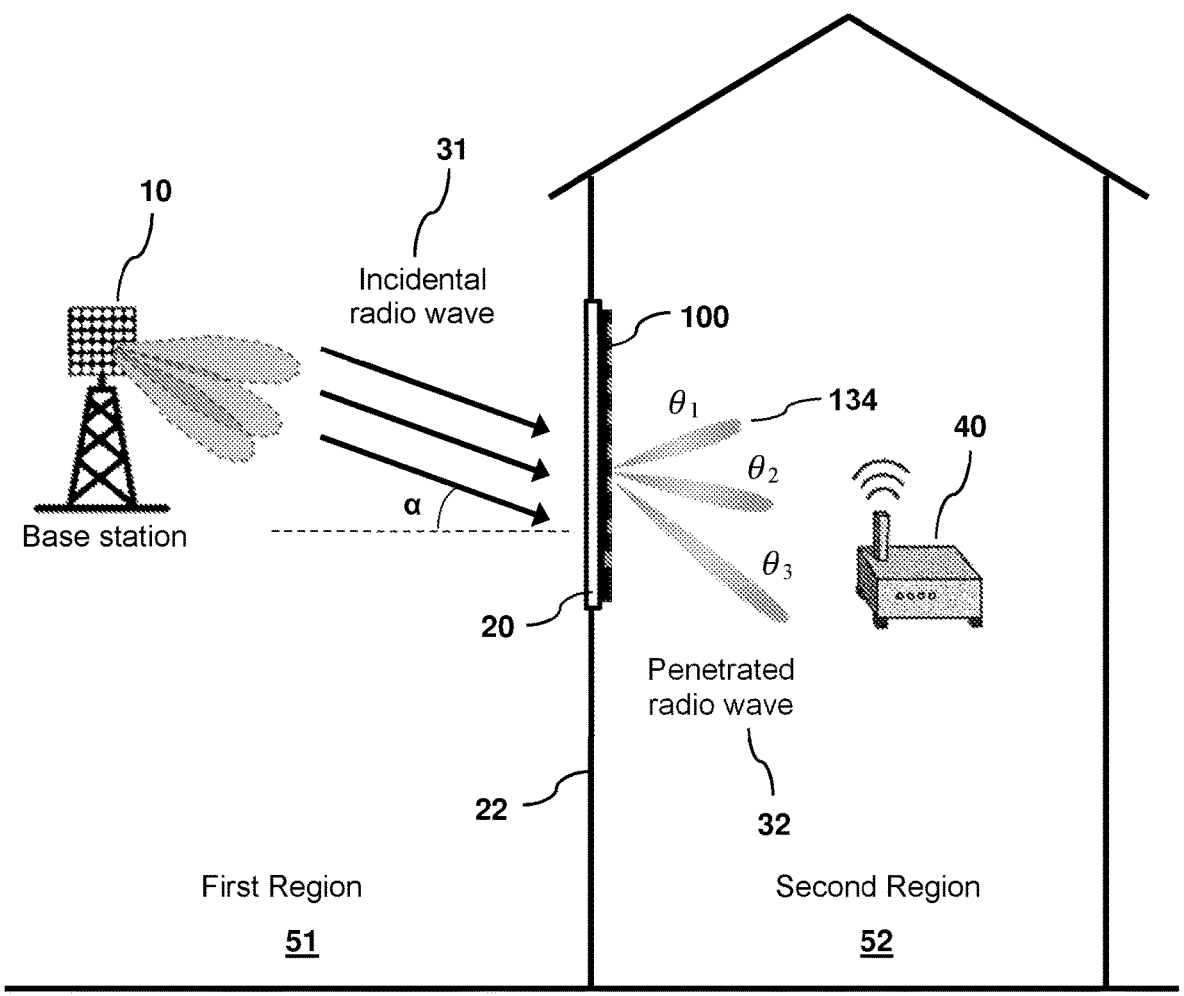
FIG. 3 is a conceptual diagram depicting the propagation of the wireless communication signal through a substrate with a bendable resin attached in accordance with certain embodiments of the present disclosure.

The present disclosure provides an alternative structure of a bendable resin 100 with metal patterns that seeks to improve the penetration of the wireless communication signals. FIG. 3 is a conceptual diagram depicting the propagation of an incidental radio wave from an outdoor BS 10 to a CPE 40 at an indoor position through a substrate 20 with a bendable resin 100 in accordance with one embodiment of the present disclosure. The bendable resin 100 is attachable to either side of the substrate 20 having a first dielectric constant. By attaching the bendable resin 100 to the substrate 20, the penetration of the incidental radio wave 31 with a wavelength λ from a first region 51 through the substrate 20 to a second region 52 can be enhanced. The CPE 40 in the second region 52 can effectively communicate with the BS 10 as the penetrated radio wave 32 is a stronger signal. In particular, the bendable resin 100 is configured to form one or more communication signal beams 134 in the second region 52. This effect is more obvious if the incidental radio wave 31 comes from an angle α greater than 0 degree.

Figure 4:
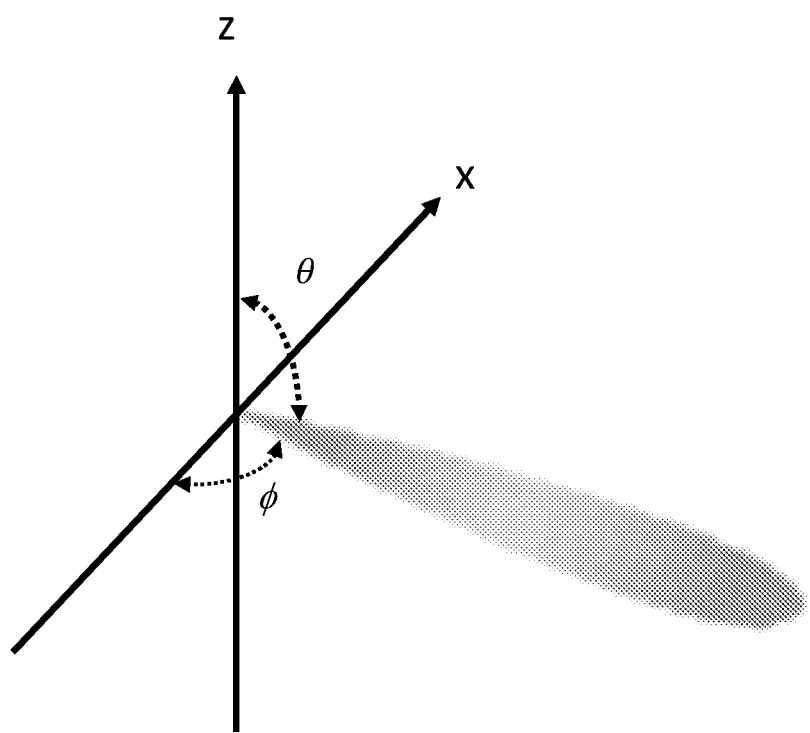
FIG. 4 shows the beam tilting definition for illustrating the propagation of the wireless communication signal.

In certain embodiments, the penetrated radio wave 32 can be a single beam or multiple beams radiating out in accordance with the need of the application. Each individual communication signal beam 134 is tilted from the incidental radio wave 31 by different angles. In the illustrated embodiment of FIG. 3, there are three communication signal beams 134 projecting at the angle $\theta_1$, $\theta_2$, and $\theta_3$. Particularly, the communication signal beam 134 is formed with a first angle θ of 1° to 179° from a vertical direction, and a second angle θ of 1° to 179° from a horizontal direction. An example of the beam tilting is illustrated in FIG. 4. Each communication signal beam 134 can be controlled in the beam amplitude, phase, and focus position.

Figure 5:
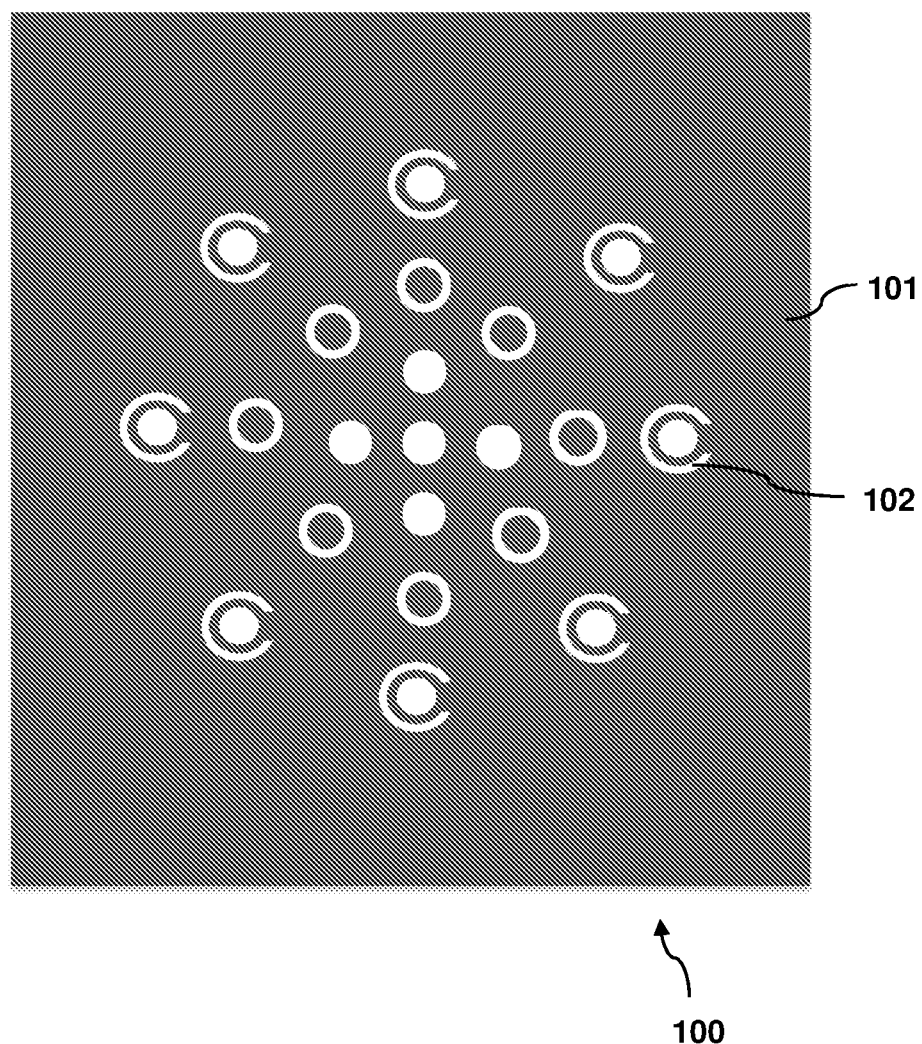
FIG. 5 shows an example of a bendable resin in accordance with certain embodiments of the present disclosure.

Referring to FIG. 5, the bendable resin 100 has a base layer 101 and one or more patterned elements 102 generated by a computer program to optimize the transmission by tilting the incidental radio wave 31 and forming a communication signal beam 134 at the first angle θ and the second angle θ. Each of the patterned elements 102 is formed by providing a meta-pattern 104 on the base layer 101. In particular, the base layer 101 is made of a first material, and the one or more patterned elements 102 are made of a second material. The first material and the second material are different and selected from the group consisting of a dielectric material and a metallic material. In one embodiment, the metallic material is a metal or a metal oxide. In yet another embodiment, the dielectric material is polycarbonate, Polyethylene Terephthalate (PET), Polyvinyl chloride (PVC), Acrylonitrile butadiene styrene (ABS), or Poly(methyl methacrylate) (PMMA). Preferably, the dielectric material has a dielectric constant of 3 to 3.9, which is between the dielectric constant of air and the dielectric constant of glass. The thickness of the bendable resin 100 depends on the target operating frequency ω for transmitting through the substrate 20. In general, the bendable resin 100 has a thickness of 1/10 λ to 1/4 λ.

Figure 6A:
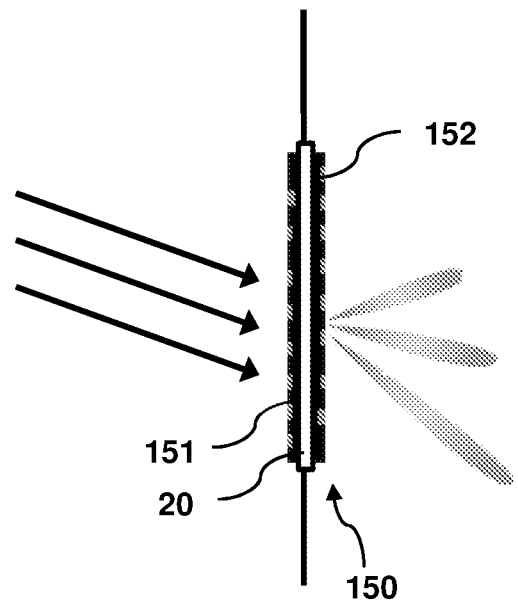
FIG. 6A is a conceptual diagram depicting the propagation of the wireless communication signal through a substrate with bendable resins attached on both sides in accordance with certain embodiments of the present disclosure.

In order to further improve the propagation of the wireless communication signal through the substrate 20 bi-directionally, another aspect of the present disclosure provides attaching bendable resins 151, 152 on both sides of the substrate 20 to form a multiple resins structure 150, as shown in FIG. 6A. The multiple resins structure 150 has a first bendable resin 151 attachable to the first surface of the substrate 20 from the first region 51, and a second bendable resin 152 attachable to the second surface of the substrate 20 from the second region 52. The two bendable resins 151, 152 may not identical as each bendable resin may be configured to beam focus on different focal points. The first and second bendable resins 151, 152 are configured to enhance penetration of a first radio wave from the first region 51 through the substrate 20 to the second region 52 by forming one or more first communication signal beams 134 in the second region 52, and a second radio wave from the second region 52 through the substrate 20 to the first region 51 by forming one or more second communication signal beams 134 in the first region 51. Each of the first and second bendable resins 151, 152 includes a base layer 101 of a first material, and one or more patterned elements 102 each formed by providing a meta-pattern 104 of a second material on the base layer 101. The thickness is preferably between 1/10 λ and 1/4 λ. The first and second materials are different and can be a dielectric material and a metallic material. The meta-patterns 104 for the first and second bendable resins 151, 152 are configured to respectively tilt the first and second radio waves to the one or more first and second communication signal beams 134, wherein each individual communication signal beam 134 is beam focused at a predetermined focal point or a predetermined focal area. In certain embodiments, the meta-pattern 104 is configured to adjust a projection angle, an amplitude, and a phase of the incidental radio wave 31.

Figure 6B:
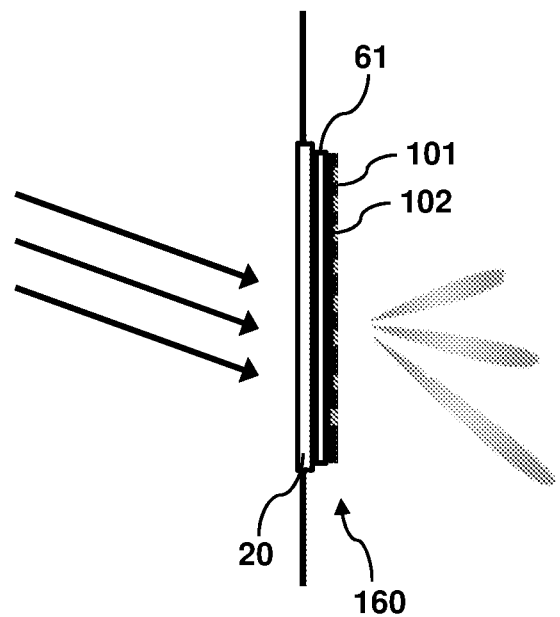
FIG. 6B is a conceptual diagram depicting the propagation of the wireless communication signal through a substrate layer with a multilayer structure attached in accordance with certain embodiments of the present disclosure.

Another aspect of the present disclosure provides a multilayer structure 160 for propagating the wireless communication signal through a substrate 20 using a hybrid approach, which is illustrated in FIG. 6B. The multilayer structure 160 comprises a base layer 101 of a first material, a transparent film 61 attached to the base layer 101 for interfacing the substrate 20 and lowering the dielectric constant of the substrate 20; and one or more pattern elements 102 each formed by providing a meta-pattern 104 of a second material on the base layer 100 or the transparent film 61. As the substrate 20 has a dielectric constant significantly larger than the dielectric constant of the air, by providing a transparent film 61 between the substrate 20 and the base layer 101, the substrate 20 can lower the dielectric constant to a value closer to the air. With the one or more pattern elements 102 provided on the base layer 101 or the transparent film 61, the transmitted signal can form one or more communication signal beam 134 with stronger signal strength. Preferably, the transparent films 61 have a dielectric constant smaller than the dielectric constant of the substrate 20 for improving the signal transmission. An example of the material of the transparent film 61 is polycarbonate with dielectric constant of 3 to 3.9.

Figure 6C:
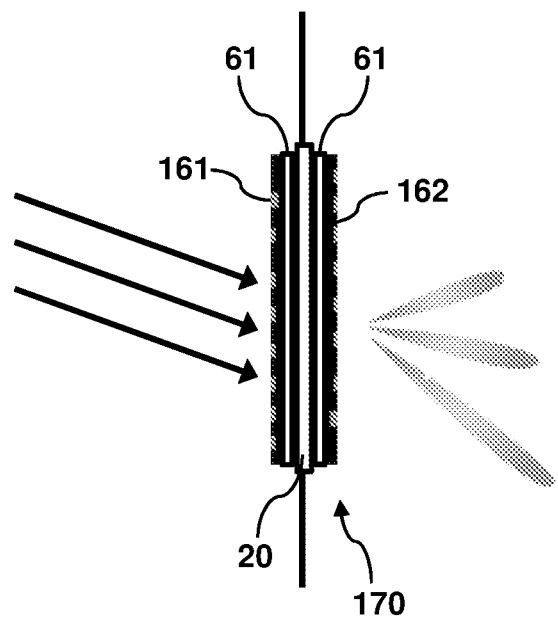
FIG. 6C is a conceptual diagram depicting the propagation of the wireless communication signal through a substrate layer with two multilayer structures attached in accordance with certain embodiments of the present disclosure.

Similarly, the multilayer structure 160 can also be applied to the case of bi-directional transmission, as illustrated in FIG. 6C. Multilayer structures 161, 162 are attached on both sides of the substrate 20 to form a multiple multilayer structure 170. As shown in the illustrated embodiment, The multiple multilayer structure 170 has a first multilayer structure 161 attached to the first surface of the substrate 20 from the first region 51, with a transparent film 61 provided between the substrate 20 and the base layer 101. The multiple multilayer structure 170 further has a second multilayer structure 162 attached to the second surface of the substrate 20 from the second region 52, with a transparent film 61 provided between the substrate 20 and the base layer 101.

Figure 6D:
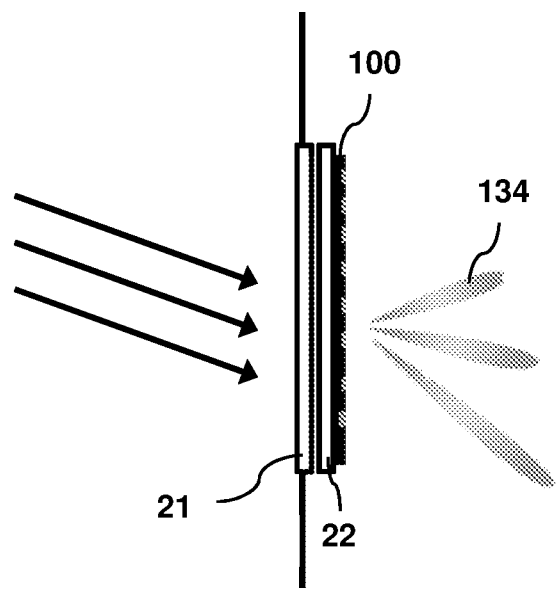
FIG. 6D is a conceptual diagram depicting the propagation of the wireless communication signal through two substrate layers with a bendable resin attached on the inner side in accordance with certain embodiments of the present disclosure.

For the case of a double layer glass, there are two substrates 21, 22 where the wireless communication signal is propagated through. As illustrated in FIG. 6D, a bendable resin 100 may be attached to one side of the double layer glass for tilting the incidental radio waves to form the communication signal beam 134. However, a double layer glass is characterized by different properties than a single layer of glass, and the extra layer of glass increases the impact of the radio wave reflection and penetration loss. Therefore, the penetrated radio wave 32 is much weaker than the incidental radio wave 31 transmitting from the BS 10.

Figure 6E:
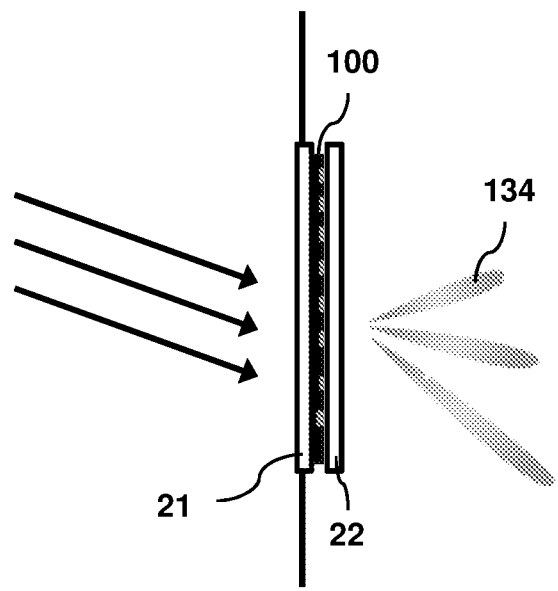
FIG. 6E is a conceptual diagram depicting the propagation of the wireless communication signal through two substrate layers with a bendable resin attached in between in accordance with certain embodiments of the present disclosure.

As shown in FIG. 6E, an improved configuration for propagating the wireless communication signal through the double layer glass is provided. Between the two substrates 21, 22, a bendable resin 100 is provided and attached. The advantage of forming one or more communication signal beams 134 by the bendable resin 100 after passing through the first substrate 21 allows the penetrated radio wave 32 to easily transmit through the second substrate 22 and beam focus the one or more communication signal beams 134 to a predetermined focal point or a predetermined focal area in the second region 52.

Figure 7A:
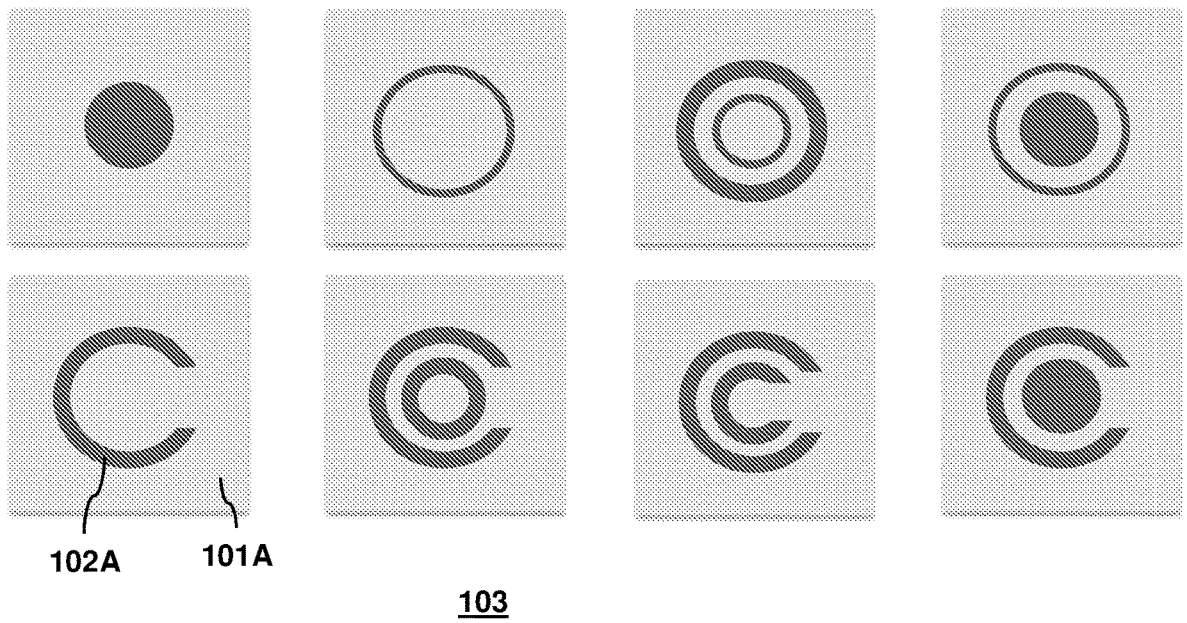
FIG. 7A shows examples of feature pattern with a dielectric layer and a metallic pattern in accordance with certain embodiments of the present disclosure.
Figure 7B:
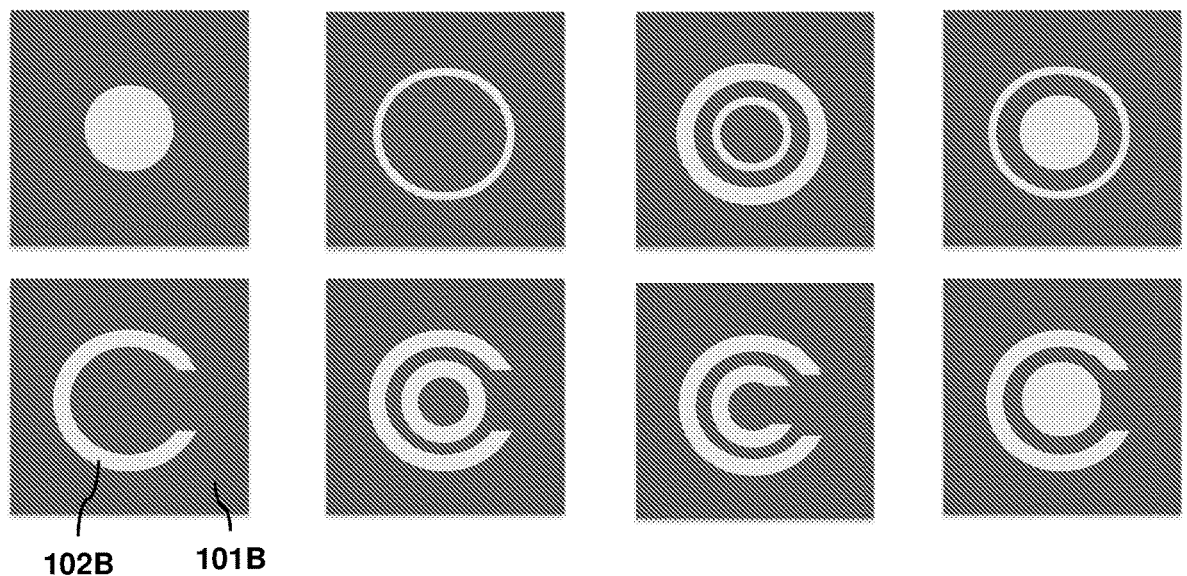
FIG. 7B shows examples of feature pattern with a metallic layer and a dielectric pattern in accordance with certain embodiments of the present disclosure.

The meta-pattern 104 for forming the one or more patterned elements 102 may be obtained by combining plural feature patterns 103 or generated by performing array synthesis using an artificial intelligence algorithm. FIG. 7A shows eight examples of the feature pattern 103 with a dielectric layer 101A and a metallic pattern 102A, while FIG. 7B shows another eight examples of the feature pattern 103 with a metallic layer 101B and a dielectric pattern 102B. The feature patterns 103 may be generated by a computer program or created by a user or an administrator. It is apparent that the feature patterns 103 shown in the present disclosure are not exhaustive examples. The meta-pattern 104 is an optimized pattern that can tilt the incidental radio wave 31 and adjust the amplitude and phase of the incidental radio wave 31 for forming the one or more communication signal beams 134 when the incidental radio wave 31 is transmitting through the substrate 20 to the second region 52. Each of the one or more communication signal beams 134 is beam-focused at a predetermined focal point or a predetermined focal area in the second region 52.

The formulation of the array synthesis problem is generalized as follows. Assuming a linear array of N isotropic elements at locations $x_1, \ldots, x_N \in R^3$, a harmonic plane wave with frequency $w$ and wavelength λ is incident from direction θ and propagates across the linear array. The output array of N elements is converted to baseband, and weighted by the weights $w_i$, and summed to give the linear array beam pattern:

$$G(\theta) = \sum_{i=1}^{N} w_i e^{(-j\frac{2\pi}{\lambda} x_i \cdot r)} \qquad \text{(Eq. 1)}$$

wherein: $w = [w_1, \ldots, w_N]^T$ is the complex weight vector to be designed;

G(θ) is the gain for representing the signal strength; and i, j, and r are non-negative integers.

The array synthesis for determining the meta-pattern 104 is a computation intensive process and it is difficult to optimize. The present disclosure advantageously applies an artificial intelligence algorithm with machine learning, which is configured to solve the array synthesis problem with great efficiency.

Figure 8:
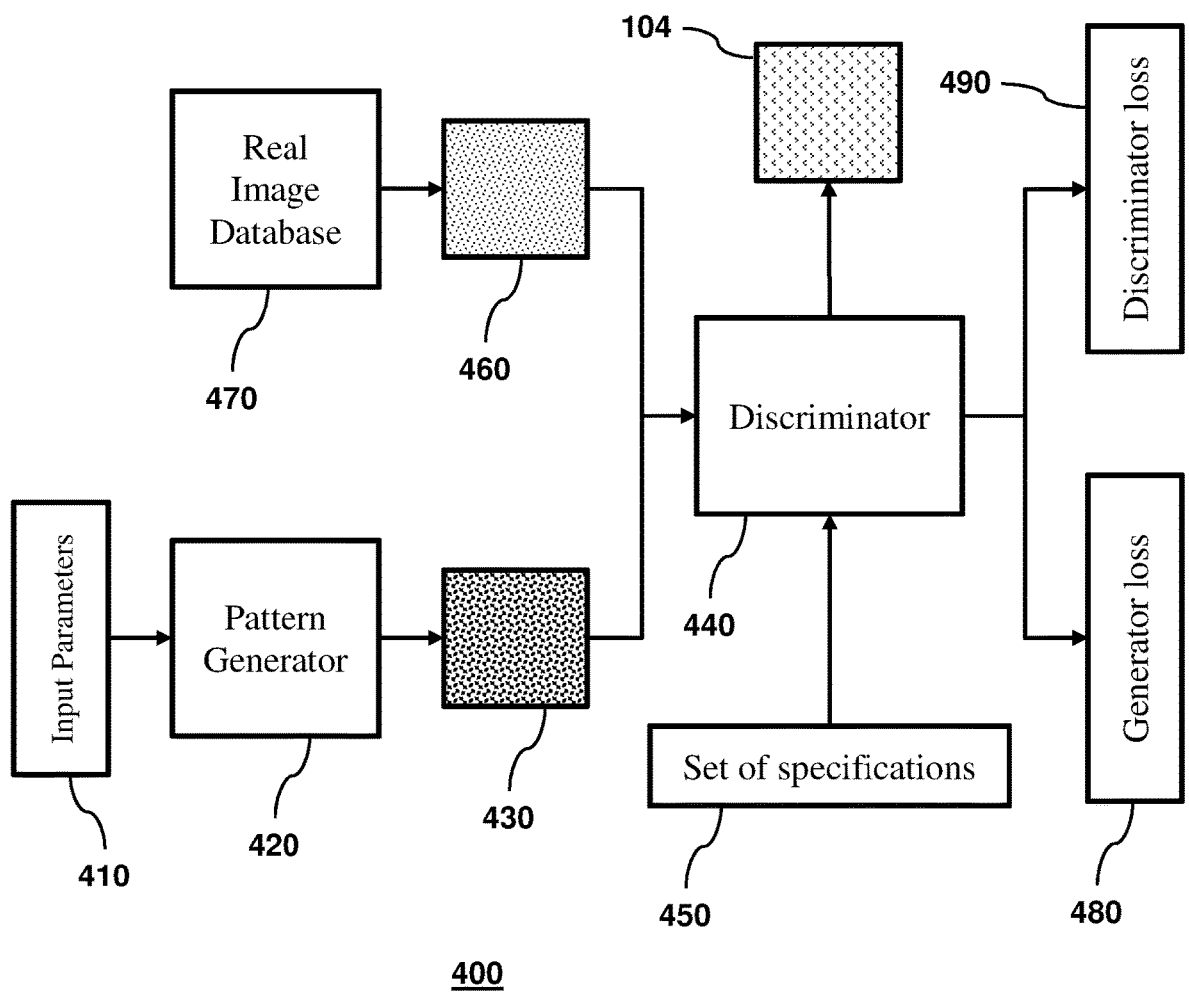
FIG. 8 is a block diagram illustrating the machine learning system implementing an artificial intelligence algorithm for generating the patterned elements on the bendable resin in accordance with certain embodiments of the present disclosure.

FIG. 8 is a block diagram illustrating a machine learning system 400 for solving the array synthesis problem and for generating the patterned elements 102 on the bendable resin 100 using the artificial intelligence algorithm. The system comprises a pattern generator 420 for generating emulation images 430, a real image database 470, and a discriminator 440. The artificial intelligence algorithm is executable by a processor or a computer device, which can be iteratively trained to compute an output of a meta-pattern 104 that can be used for forming one or more patterned elements 102 for transmitting an incidental radio wave 31 through a substrate 20 based on a set of specifications 450. The meta-pattern 104 is configured to adjust an amplitude and a phase of the incidental radio wave 31 when the incidental radio wave 31 is transmitting from the substrate 20 to the second region 52.

The set of specifications 450 is associated with a predetermined focal point or a predetermined focal area in the second region 52, which is defined and provided to the machine learning system. The set of specifications 450 may include, but be not limited to, the projection angle, the amplitude, and phase of the one or more communication signal beams 134, and the position of the focal point or the focal area from the substrate 20. The machine learning system 400 further employs the real image database 470 for determining a real image 460 for comparing with the emulation images 430. The real image database 470 stores actual data or transmission results from other sources or other previous results for assisting the machine learning system 400 to learn and compare the randomly generated emulation images 430. Next, input parameters 410 are set randomly to the pattern generator 420, such that the pattern generator 420 can generate an emulation image 430, which may include a plurality of feature patterns 103 arranged in rows and columns repeatedly. The emulation image 430 and the real image 460 are coupled to a discriminator 440 for comparison. In particular, the discriminator 440 determines a discriminator loss 490 and a generator loss 480 based on a discrimination in a signal strength between the real image 460 and the emulation image 430.

By iterating the input parameters 410, the pattern generator 420 can generate other novel emulation images. For each novel emulation image, a respective discrimination in signal strength is determined by the discriminator 440. After completing the iterations, the system can determine a meta-pattern 104 for the set of specifications 450 with the smallest values in the discriminator loss 490 and the generator loss 480, thereby the meta-pattern 104 obtained from the artificial intelligence algorithm can be used to form the patterned elements 102 on the bendable resin 100 and achieve the performance as defined by the set of specifications 450.

Figure 9A:
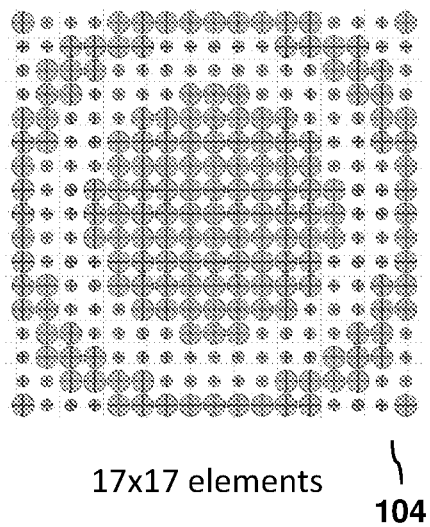
FIG. 9A illustrates the structure of a meta-pattern designed with a single focal point.
Figure 9A:
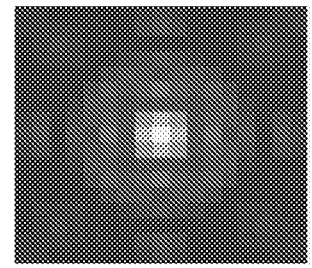
Figure 9B:
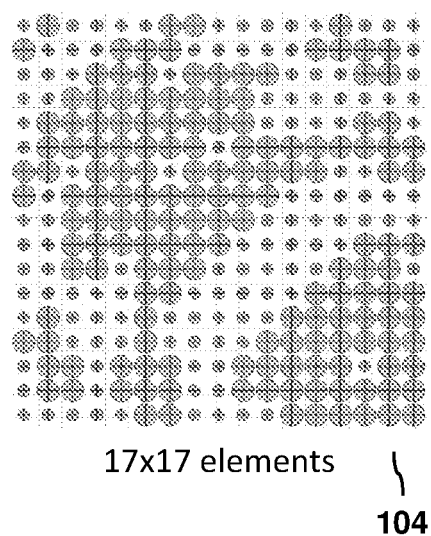
FIG. 9B illustrates the structure of a meta-pattern designed with dual focal points.
Figure 9B:
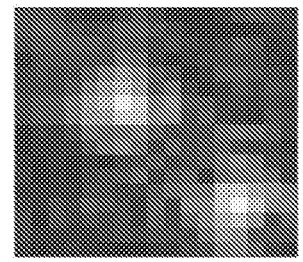
Figure 10A:
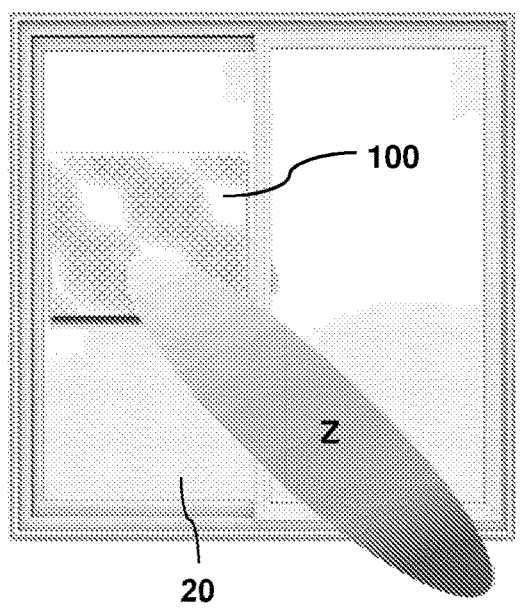
FIG. 10A is a conceptual diagram depicting a window attached with a bendable resin having a single beam tilt.
Figure 10B:
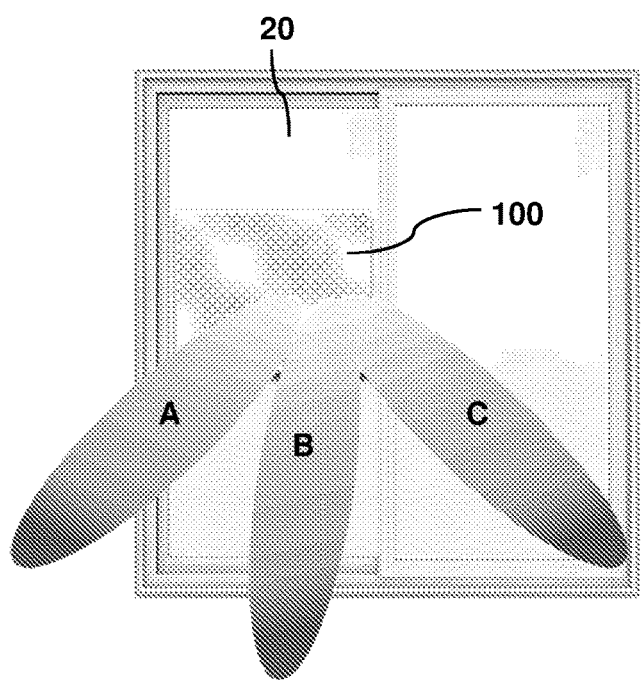
FIG. 10B is a conceptual diagram depicting a window attached with a bendable resin having multiple beam tilts.

FIG. 9A shows the structure of a meta-pattern 104 designed with a single focal point. FIG. 9B shows the structure a meta-pattern designed with dual focal points. The meta-patterns 104 are both generated by combining 17×17 feature patterns 103 arranged in rows and columns repeatedly using the machine learning system 400. The artificial intelligence algorithm determines which feature pattern 103 is placed at each of the 289 positions on the meta-pattern 104, which can adjust the projection angle, amplitude, and phase of the incidental radio wave 31. As the bendable resin 100 has one or more pattern elements 102 arranged in rows and columns repeatedly across the base layer 101 and formed by providing a meta-pattern 104, and the meta-pattern 104 are formed by combining plural feature patterns 103, thereby the bendable resin 100 can transmit the incidental radio wave 31 by forming one or more communication signal beams 134 to the predetermined focal point or focal area as defined by the set of specifications 450. FIG. 10A shows a conceptual diagram depicting a window attached with a bendable resin 100 having a single beam tilt, capable of forming one communication signal beam 134. FIG. 10B shows a conceptual diagram depicting a window attached with a bendable resin 100 having multiple beam tilts, and capable of forming one or more communication signal beams 134. With the same size of the bendable resin 100, the total power of the one or more communication signal beams 134 is the same the case when there is only one communication signal beam 134, as the energy is conserved. As an example, the energy conservation can be summarized as follow:

$$\text{Loss(resin 1)} + P_Z = \text{Loss(resin 2)} + P_A + P_B + P_C \quad \text{(Eq. 2)}$$

Figure 11:
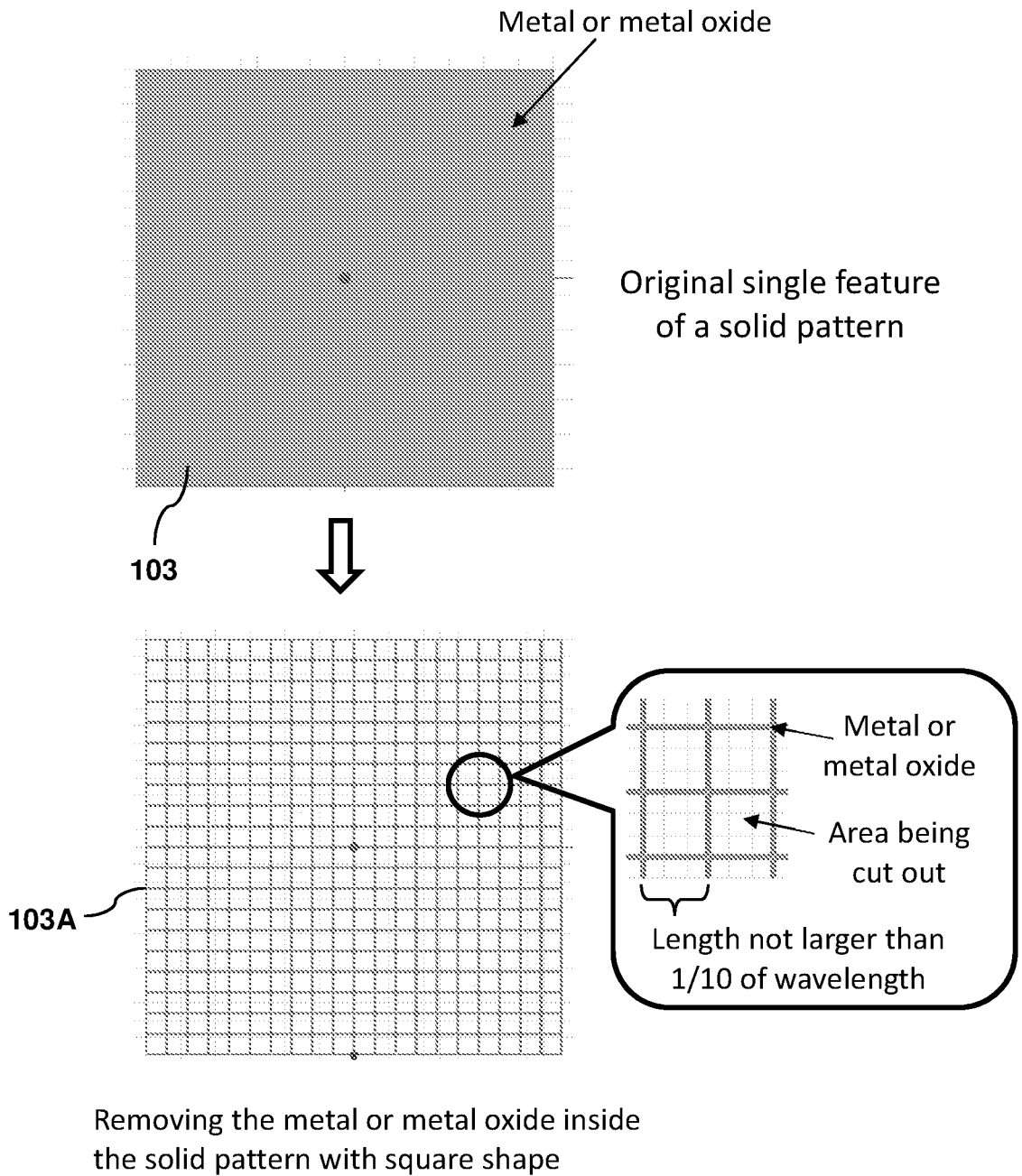
FIG. 11 illustrates the structure of a feature pattern in a bendable resin that can achieve transparency.

Another aspect of the present disclosure provides a feature pattern 103 that can achieve transparency, as illustrated in FIG. 11. In the illustrated embodiment, the feature pattern 103 is a solid pattern. The solid pattern is made of a metallic material, such as metal or metal oxide. In order to achieve transparency, the solid pattern is replaced by a grid structure with cut-outs. The metallic material comprises a metallic grid 103A having plural metallic lines and cut-out areas. Each of the plural metallic lines is separated from an adjacent metallic line by a length less than or equal to $\frac{1}{10} \lambda$. It is apparent that the grid structure may also be applied to other feature patterns 103 without departing from the scope and spirit of the present disclosure. The shape, the size, and design of the metallic grid 103A are not limited to that shown in the figures and may vary depending on the operation frequency, antenna gain, and beam formation requirements.

Figure 12A:
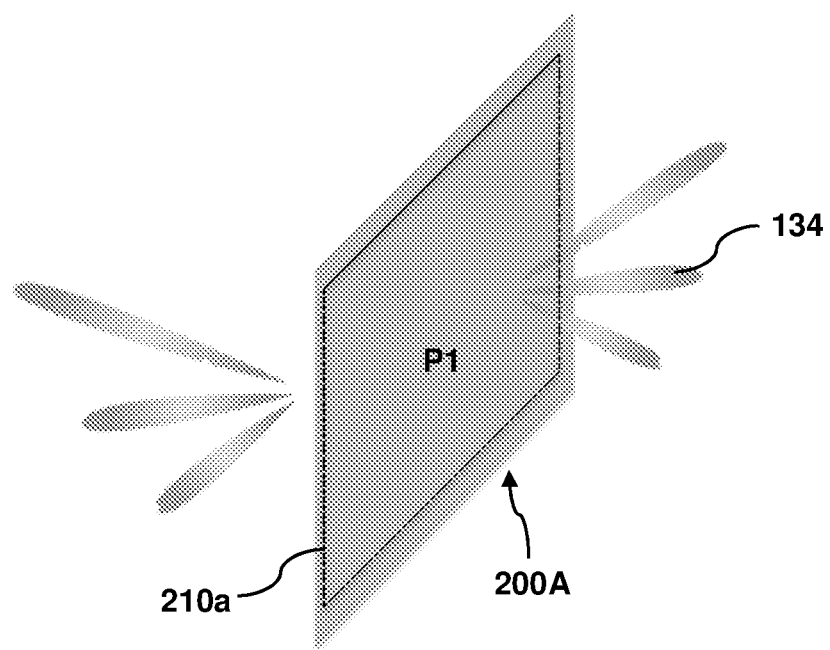
FIG. 12A is a conceptual diagram depicting the first configuration of the bendable resin in accordance with certain embodiments of the present disclosure.

FIG. 12A shows a first bendable resin 200A at least partially covered by a patterned element 210a, which is configured to tilt the incidental radio wave 31 to form a communication signal beam 134 beam focusing at a predetermined focal point or predetermined focal area in the second region 52. In the illustrated embodiment, the patterned element 210a has a first meta-pattern P1.

Figure 12B:
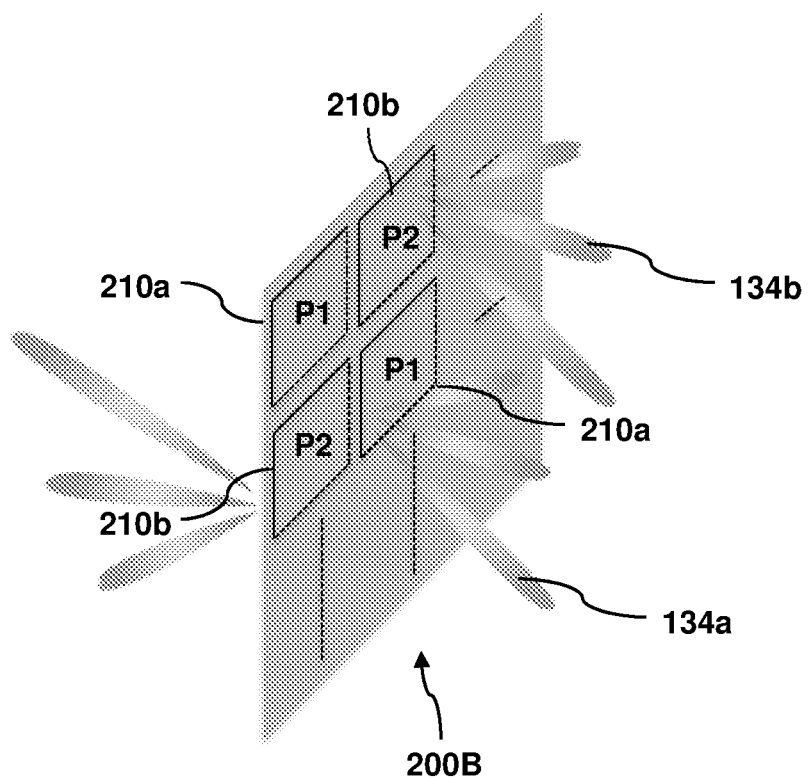
FIG. 12B is a conceptual diagram depicting the second configuration of the bendable resin in accordance with certain embodiments of the present disclosure.
Figure 13A:
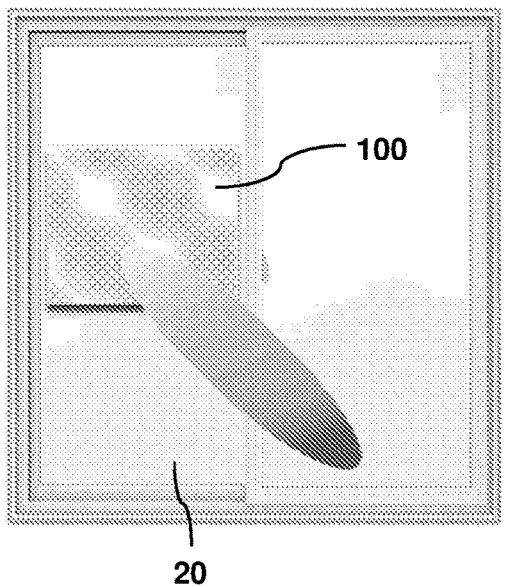
FIG. 13A is a conceptual diagram depicting a window attached with a bendable resin for tilting the wireless communication signal to a first direction.
Figure 13B:
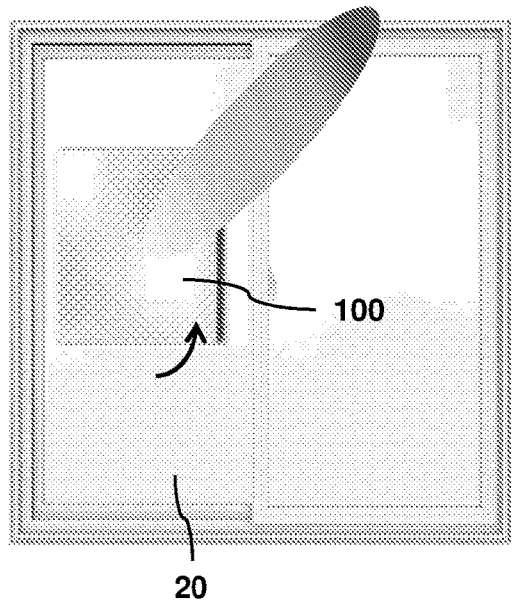
FIG. 13B is a conceptual diagram depicting a window attached with a bendable resin for tilting the wireless communication signal to a second direction.
Figure 13C:
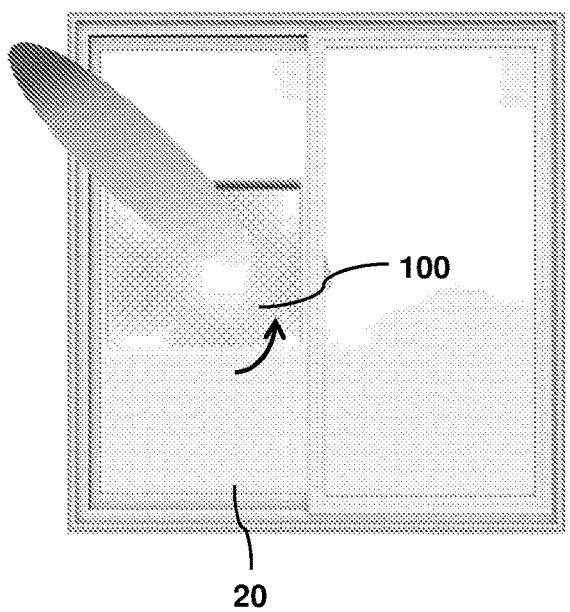
FIG. 13C is a conceptual diagram depicting a window attached with a bendable resin for tilting the wireless communication signal to a third direction.
Figure 13D:
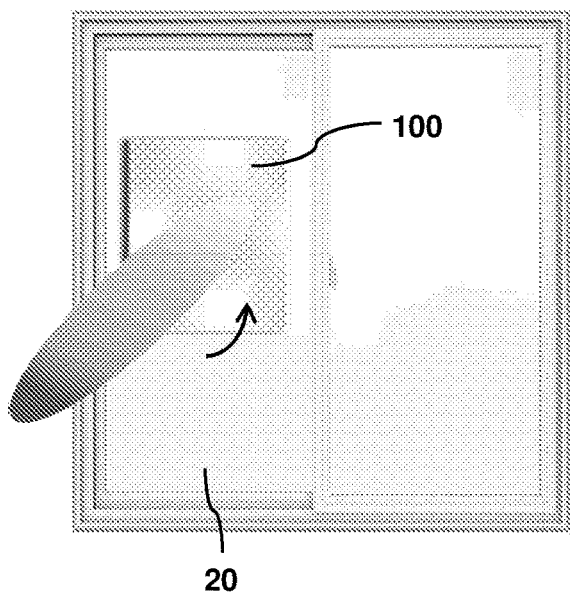
FIG. 13D is a conceptual diagram depicting a window attached with a bendable resin for tilting the wireless communication signal to a fourth direction.

FIG. 12B shows a second bendable resin 200B at least partially covered by a plurality of patterned elements 210a, 210b. The plurality of patterned elements 210a, 210b may each has different meta-pattern 104 and/or different dimensions. In the illustrated embodiment, the first patterned element has a first meta-pattern P1 for forming a first communication signal beam 134a, and the second patterned element has a second meta-pattern P2 for forming a second communication signal beam 134b. Therefore, each of the plurality of patterned elements 210a, 210b may be configured to tilt the incidental radio wave 31 by a particular angle, thereby one or more communication signal beams 134 are formed focusing at predetermined focal points or predetermined focal areas in the second region 52. The patterned elements 210a, 210b may not fully cover the entire area of the second bendable resin 200B, and the uncovered area is the base layer without patterned elements 210a, 210b.

From the above description of the bendable resin 100, it is clear that the direction of the communication signal beam 134 depends on the pattern elements 102, wherein the meta-pattern 104 provided on the pattern element 102 defines the angle, amplitude, and phase. Referring to FIG. 13A-13D, the bendable resin 100 may be rotated to adjust the propagation direction before attaching to the substrate 20.

Figure 14A:
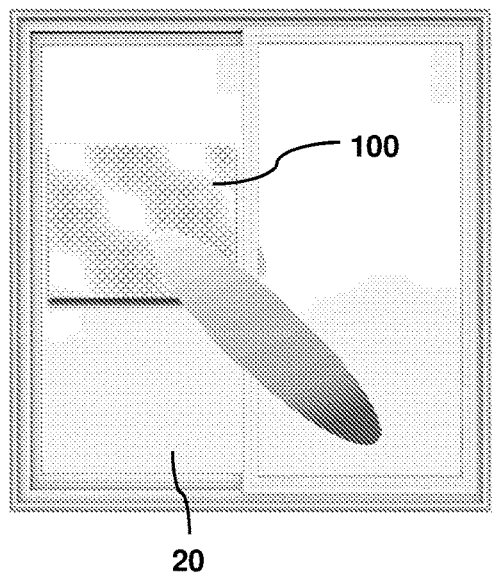
FIG. 14A is a conceptual diagram depicting a window attached with a small bendable resin.
Figure 14B:
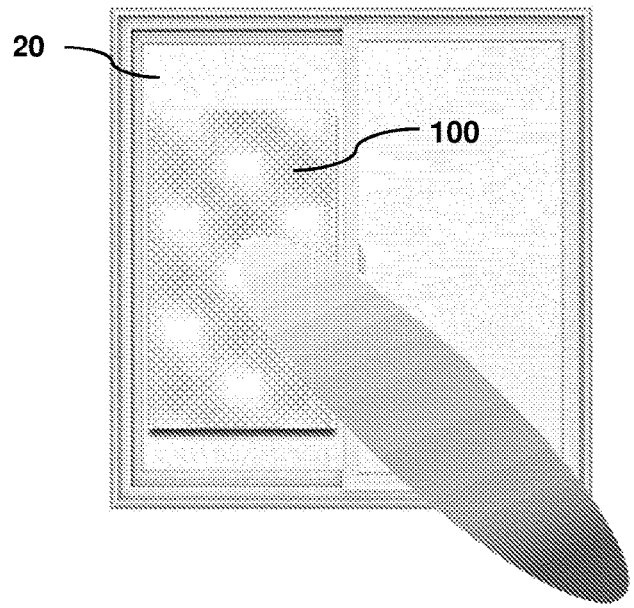
FIG. 14B is a conceptual diagram depicting a window attached with a large bendable resin.

FIG. 14A-14B also illustrates the relationship between the size of the bendable resin 100 and the focal area. By increasing the size of the bendable resin 100, the focal area can also be increased.

Figure 15A:
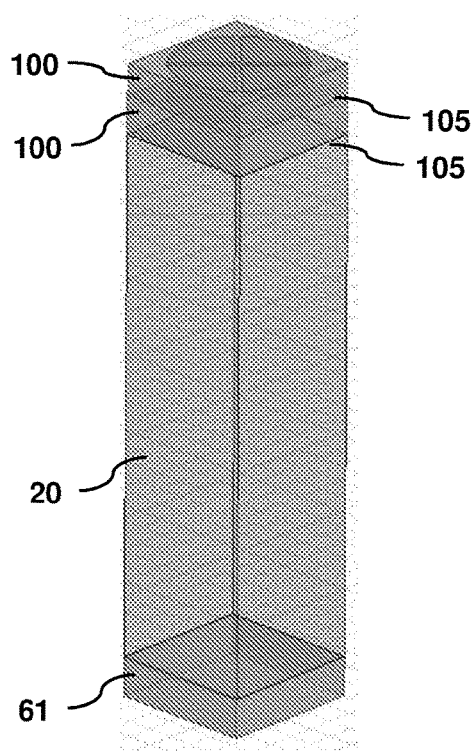
FIG. 15A is a conceptual diagram depicting two bendable resins attached to a substrate in accordance with certain embodiments of the present disclosure.
Figure 15B:
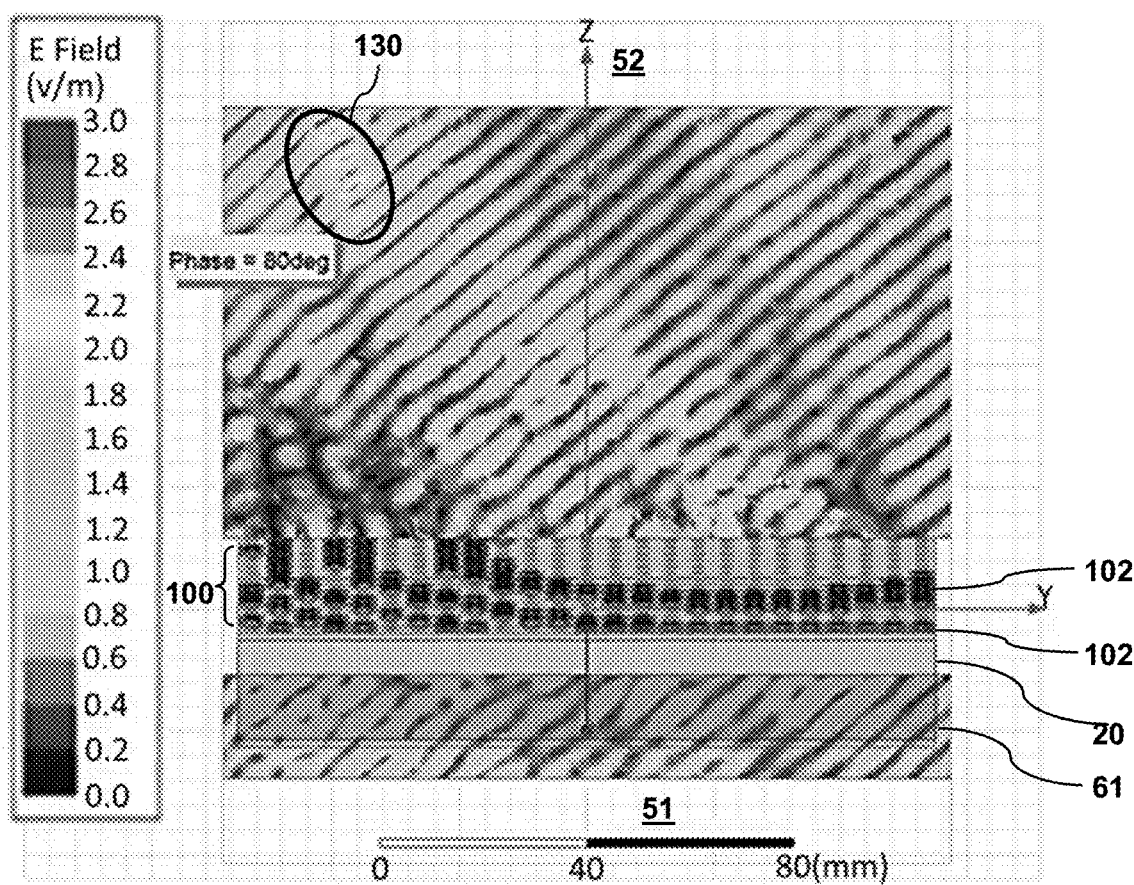
FIG. 15B is a simulation result of the propagation of the wireless communication signal through the two bendable resins and substrate of FIG. 15A.

FIG. 15A shows another application of the present disclosure with two bendable resins 100 attached to a substrate 20. The bendable resin 100 comprises an adhesive layer 105 for attaching to the substrate 20 or other bendable resins 100. The two bendable resins 100 are used to control the amplitude and phase of the incidental radio wave 31 to beam focus at a predetermined focal point or predetermined focal area with higher precision. In general, the use of bendable resins 100 allows better control of the transmission since more parameters can be controlled. In certain embodiments, a transparent film 61 may be attached to either side of the substrate 20 for enhancing substrate penetration and minimizing signal reflection. With the above multilayer structure, a wave transmission simulation was performed, as shown in FIG. 15B. The one or more bendable resins 100 are stacked together, such that the patterned elements 102 are substantially stacked together above the substrate 20. The incidental radio wave 31 propagates from the first region 51 through the substrate 20 and the bendable resins 100 to the second region 52, with a different phase, amplitude, and angle. The penetrated radio wave 32 is beam-focused at a predetermined focal point or focal area 130, which is shown in the simulation results.

Figure 16:
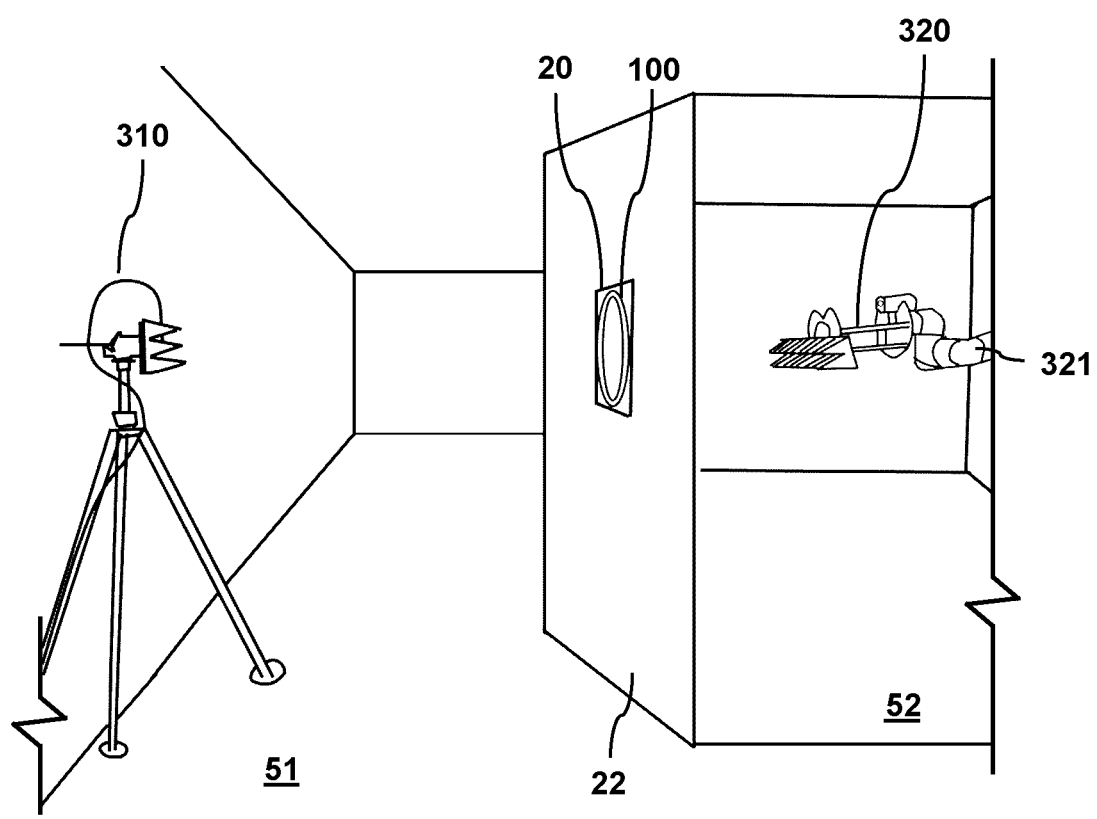
FIG. 16 is an illustration showing the laboratory setup for testing the performance of the propagation of the wireless communication signal.

FIG. 16 shows the laboratory setup for testing the performance of the propagation of the wireless communication signal. The laboratory setup is also used to acquire actual data for the real image database 470. On the first region 51, a transmitter antenna 310 is used to transmit the incidental radio wave 31. In the setup, the incidental radio wave 31 is generated by a microwave signal generator SMB100A. The substrate 20 is a glass wall of 12 mm thick with the bendable resin 100 attached. On the second region 52, a receiver antenna 320 is controlled by a mechanical system comprising a robotic arm 321. A computer system controls the mechanical system to convey the receiver antenna 320 horizontally and/or vertically for capturing the penetrated radio wave 32, and analyzed using a spectrum analyzer.

Figure 17:
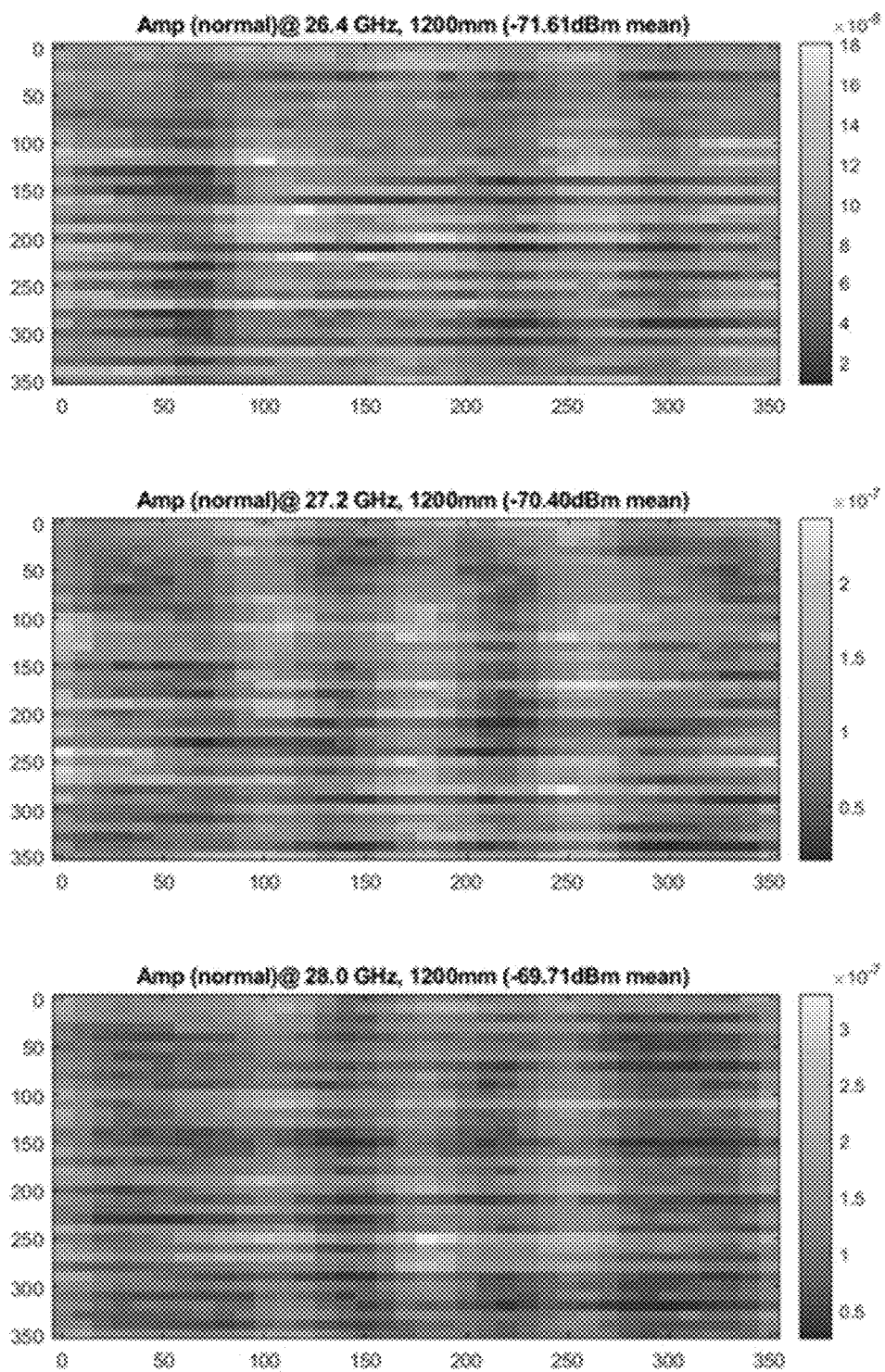
FIG. 17 shows the measurement result when only a glass layer is used.

For demonstrating the improvement in signal strength after attaching the bendable resin 100, a glass layer is used to run the test while other conditions remain the same. FIG. 17 shows the measurement results for using the glass layer only. There is no focal area detected. The highest received power is −70 dBm at 27.2 GHz.

Figure 18A:
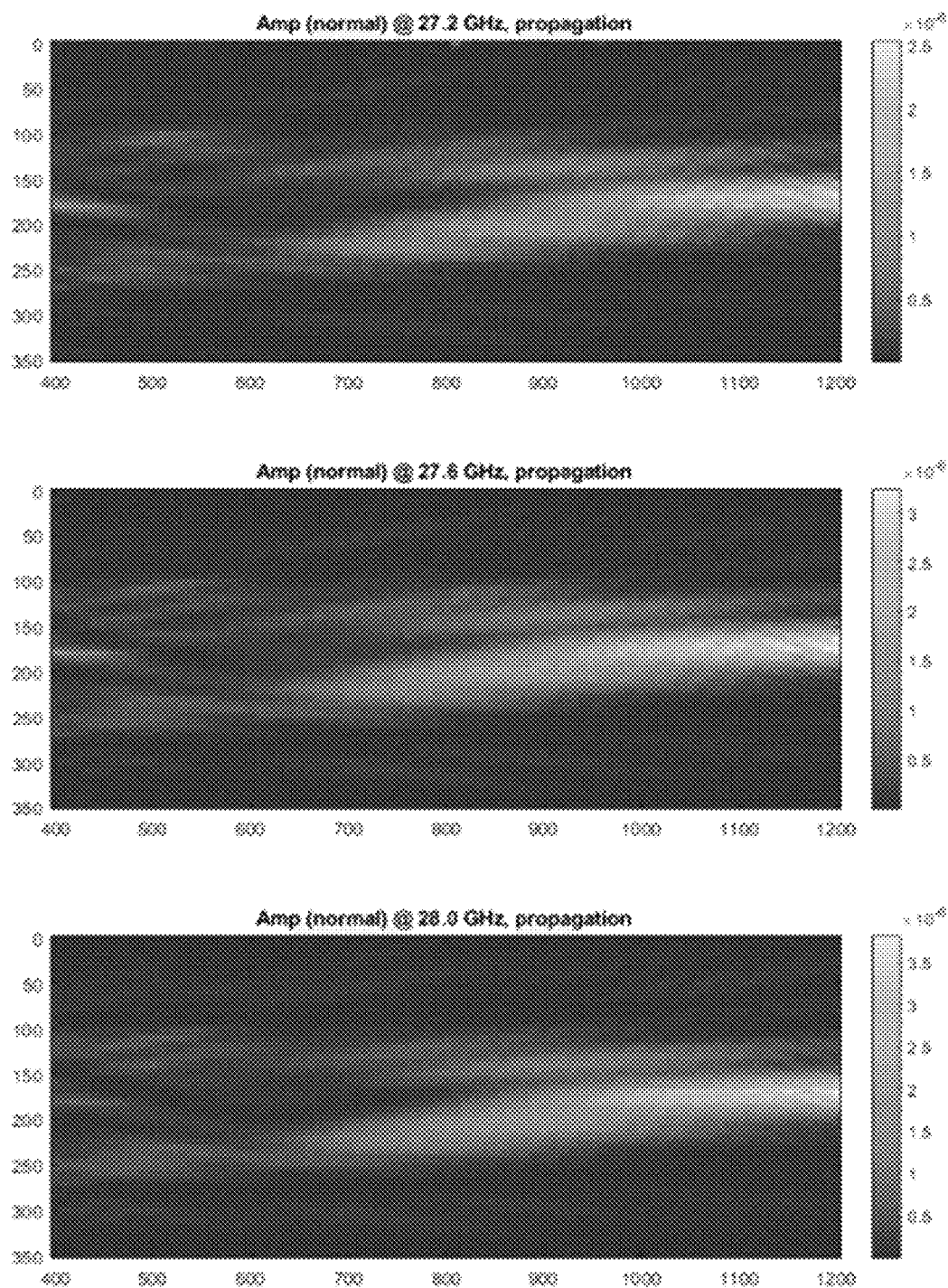
FIG. 18A shows the measurement result in Y-Z plane when a bendable resin is attached to a glass layer.
Figure 18B:
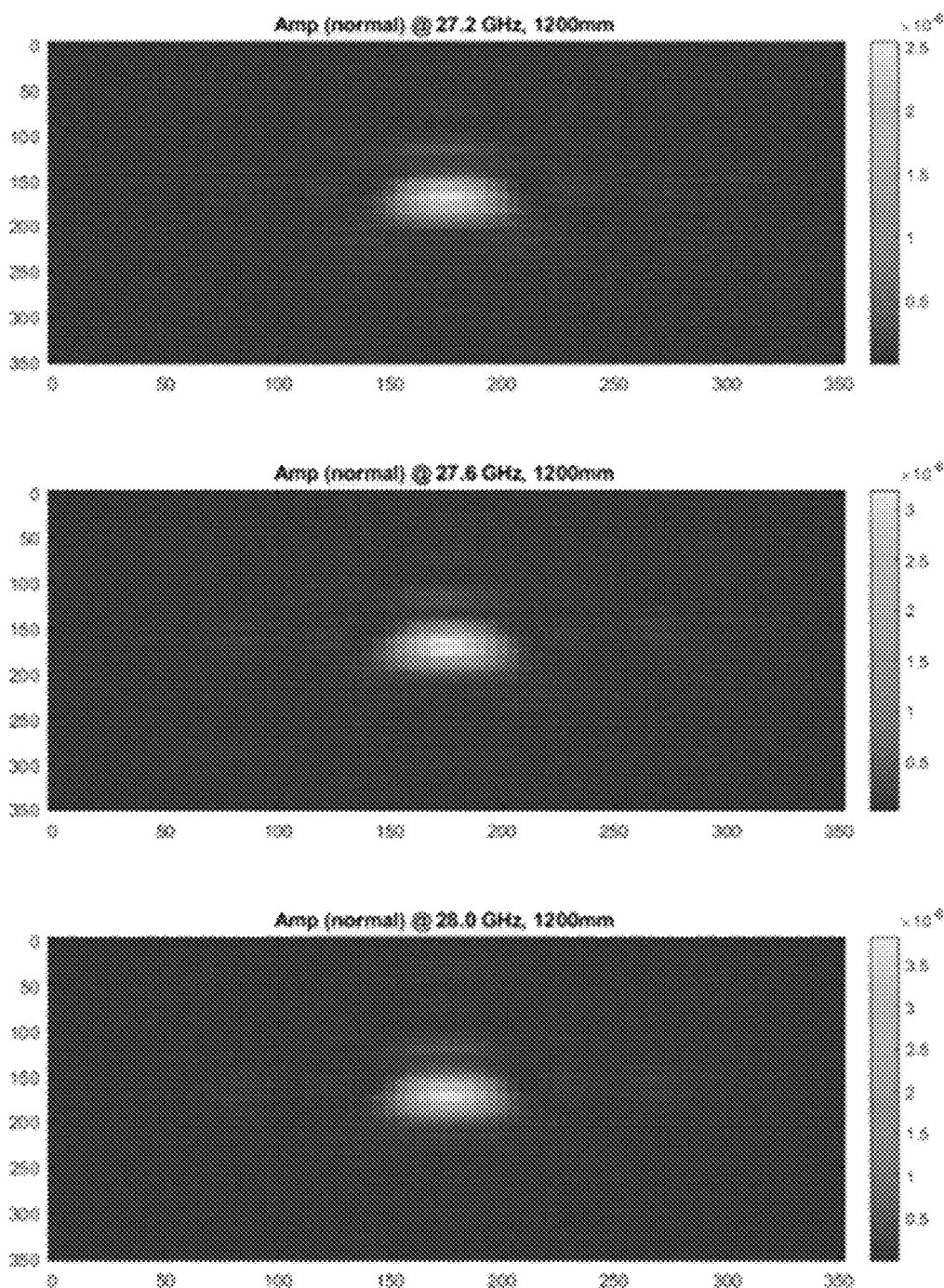
FIG. 18B shows the measurement result in X-Y plane when a bendable resin is attached to a glass layer.

Referring to FIGS. 18A and 18B, a bendable resin 100 is now attached to the glass layer. FIG. 18A is the measurement result in Y-Z plane, and FIG. 18B is the measurement result in X-Y plane. From the result, there is a focal area detected at Z=1200 mm. The highest received power is −54 dBm.

Figure 19:
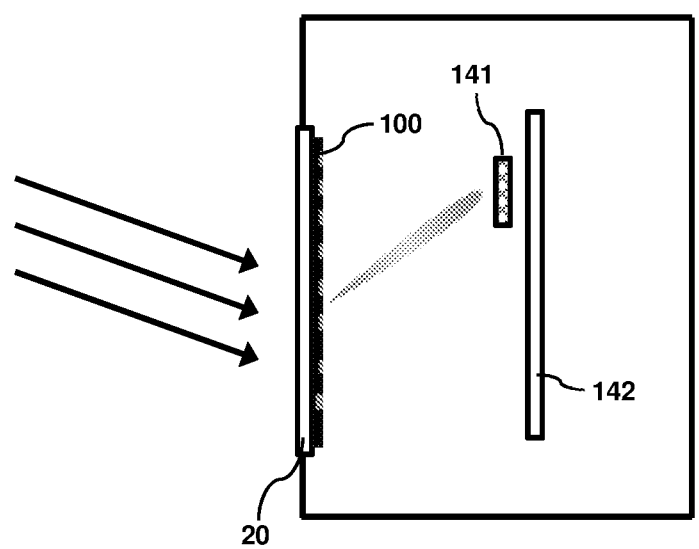
FIG. 19 is a conceptual diagram depicting the use of a bendable resin for a smart device.

The bendable resin 100 of the present disclosure can effectively provide a passive media attachable to a substrate 20, such as a glass layer, for transmitting a wireless radio wave operating with 5G or other future communication technologies. Advantageously, the communication signal beam 134 is beam focused at a particular direction and the CPE 40 placed at the focal area can receive the wireless radio wave with high signal strength. The cost is low and simple to install. The bendable resin 100 may be used in buildings, vehicles, or other smart devices for beam focusing the communication signal to an antenna. FIG. 19 provides an example of the use of the present disclosure in a smart device. The bendable resin 100 is attached to a substrate 20 for beam focusing the communication signal to an antenna 141 inside the smart device. The beam direction is well designed and the signal strength can be maximized at the position of the antenna 141 without falling to the internal circuit board 142 or other components.

This illustrates the fundamental structure of the thin bendable resin in accordance with the present disclosure. It will be apparent that variants of the above-disclosed and other features and functions, or alternatives thereof, may be combined into many other different systems or applications. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

What is claimed is:

1. A bendable resin attachable to a substrate and configured to enhance penetration of an incidental radio wave from a first region through the substrate to a second region by forming one or more communication signal beams in the second region, the bendable resin comprising:
   a base layer of a first material; and
   one or more patterned elements each formed by providing a meta-pattern of a second material on the base layer;
   wherein:
   the first and second materials are different and selected from the group consisting of a dielectric material and a metallic material; and
   each individual patterned element is configured to tilt the incidental radio wave to form the one or more communication signal beams, wherein each individual communication signal beam is beam-focused at a predetermined focal point or a predetermined focal area in the second region.

2. The bendable resin of claim 1, wherein the meta-pattern is configured to adjust an amplitude and a phase of the incidental radio wave when the incidental radio wave is transmitting through the substrate to the second region.

3. The bendable resin of claim 1, wherein the bendable resin has a thickness of 1/10 λ to 1/4 λ.

4. The bendable resin of claim 1, wherein the metallic material comprises a metallic grid having plural metallic lines, wherein each of the plural metallic lines is separated from an adjacent metallic line by a length less than or equal to 1/10 λ.

5. The bendable resin of claim 1, wherein the metallic material is a metal or a metal oxide.

6. The bendable resin of claim 1, wherein the dielectric material is polycarbonate, Polyethylene Terephthalate (PET), Polyvinyl chloride (PVC), Acrylonitrile butadiene styrene (ABS), or Poly(methyl methacrylate) (PMMA).

7. The bendable resin of claim 1, wherein the one or more patterned elements are arranged in rows and columns repeatedly across the base layer, and the meta-pattern of each of the one or more patterned elements are formed by combining plural feature patterns.

8. The bendable resin of claim 1 further comprises a transparent film attached to the base layer for lowering dielectric constant of the substrate.

9. The bendable resin of claim 8, wherein the transparent film is polycarbonate with dielectric constant of 3 to 3.9.

10. The bendable resin of claim 1, wherein the incidental radio wave is a wireless radio wave operating with 5G technologies.

11. A multilayer structure attachable to a substrate and configured to enhance penetration of an incidental radio wave from a first region through the substrate to a second region by forming one or more communication signal beams in the second region, the multilayer structure comprising:
  a base layer of a first material;
  a transparent film attached to the base layer for interfacing the substrate and lowering dielectric constant of the substrate; and
  one or more patterned elements each formed by providing a meta-pattern of a second material on the base layer or the transparent film;
  wherein:
  the first and second materials are different and selected from the group consisting of a dielectric material and a metallic material; and
  each individual patterned element is configured to tilt the incidental radio wave to form the one or more communication signal beams, wherein each individual communication signal beam is beam-focused at a predetermined focal point or a predetermined focal area in the second region.

12. The multilayer structure of claim 11, wherein the transparent film is polycarbonate with dielectric constant of 3 to 3.9.

13. The multilayer structure of claim 11, wherein the multilayer structure has a thickness of $1/10\ \lambda$ to $1/4\ \lambda$.

14. The multilayer structure of claim 11, wherein the meta-pattern is configured to adjust an amplitude and a phase of the incidental radio wave when the incidental radio wave is transmitting through the substrate to the second region.

15. A method for generating a meta-pattern for forming a patterned element on a bendable resin, the bendable resin attachable to a substrate and configured to enhance penetration of an incidental radio wave from a first region through the substrate to a second region by forming one or more communication signal beams in the second region, the method comprising the steps of:
  obtaining a set of specifications associated with a predetermined focal point or a predetermined focal area in the second region;
  determining a real image based on actual data or transmission results;
  randomly setting input parameters and generating, by a pattern generator, a plurality of feature patterns arranged in rows and columns repeatedly to form an emulation image;
  determining, by a discriminator, a discriminator loss and a generator loss based on a discrimination in a signal strength between the real image and the emulation image;
  iterating the input parameters to generate other novel emulation images for determining the discrimination in the signal strength; and
  determining the meta-pattern for the set of specifications with smallest values in the discriminator loss and the generator loss.

16. The method of claim 15 wherein the meta-pattern is configured to adjust an amplitude and a phase of the incidental radio wave when the incidental radio wave is transmitting from the substrate to the second region.

17. The method of claim 15, wherein the bendable resin further comprises a base layer of a first material, wherein the patterned element is made of a second material and formed on the base layer.

18. The method of claim 17, wherein the first and second materials are different and selected from the group consisting of a dielectric material and a metallic material.

19. The method of claim 18, wherein the metallic material is a metal or a metal oxide.

20. The method of claim 18, the metallic material comprises a metallic grid having plural metallic lines, wherein each of the plural metallic lines is separated from an adjacent metallic line by a length less than or equal to $1/10\ \lambda$.

* * * * *